United States Patent
Sikora et al.

(10) Patent No.: US 11,746,951 B2
(45) Date of Patent: Sep. 5, 2023

(54) CABLE DEPLOYMENT APPARATUS, SYSTEM, AND METHODS FOR SUSPENDED LOAD CONTROL EQUIPMENT

(71) Applicant: Vita Inclinata IP Holdings LLC, Broomfield, CT (US)

(72) Inventors: Derek Sikora, Denver, CO (US); Caleb B. Carr, Denver, CO (US); Logan Goodrich, Golden, CO (US)

(73) Assignee: Vita Inclinata IP Holdings LLC, Broomfield, CO (US)

( * ) Notice: Subject to any disclaimer, the term of this patent is extended or adjusted under 35 U.S.C. 154(b) by 796 days.

(21) Appl. No.: 16/802,368

(22) Filed: Feb. 26, 2020

(65) Prior Publication Data
US 2020/0271270 A1     Aug. 27, 2020

Related U.S. Application Data

(60) Provisional application No. 62/810,875, filed on Feb. 26, 2019.

(51) Int. Cl.
*F16M 13/00*     (2006.01)
*B66C 13/06*     (2006.01)

(52) U.S. Cl.
CPC ........... *F16M 13/005* (2013.01); *B66C 13/06* (2013.01)

(58) Field of Classification Search
CPC .... F16M 13/005; B66C 13/06; B66C 13/063; B66C 13/085; B64D 1/22
See application file for complete search history.

(56) References Cited

U.S. PATENT DOCUMENTS

| | | | |
|---|---|---|---|
| 1,935,283 A | | 11/1933 | Adams |
| 2,264,936 A | * | 12/1941 | Dorsa ................... F16G 11/105 24/132 R |
| 2,428,656 A | | 10/1947 | Elliott et al. |
| 2,651,533 A | | 9/1953 | Miller |
| 2,717,656 A | | 9/1955 | Bannister |
| 3,036,797 A | | 5/1962 | Agusta |
| 3,044,818 A | | 7/1962 | Tobey |
| 3,210,115 A | | 10/1965 | Irving et al. |
| 3,265,336 A | | 8/1966 | Peterson |
| 3,498,476 A | | 3/1970 | Mattson et al. |

(Continued)

FOREIGN PATENT DOCUMENTS

| | | |
|---|---|---|
| AE | P60001212022 | 1/2022 |
| AE | P60009522022 | 5/2022 |

(Continued)

OTHER PUBLICATIONS

International Search Report dated Apr. 3, 2019, for PCT/US19/13603, filed Jan. 15, 2019.

(Continued)

*Primary Examiner* — Michael R Mansen
*Assistant Examiner* — Juan J Campos, Jr.
(74) *Attorney, Agent, or Firm* — Martin Spencer Garthwaite

(57) ABSTRACT

Disclosed are systems, apparatuses, and methods to deploy a suspended load control apparatus onto a suspension cable and optionally allowing the suspended load control system to rotate about the suspension cable without imparting a significant rotational force on the suspension cable from rotation of the suspended load control system.

20 Claims, 17 Drawing Sheets

(56) References Cited

U.S. PATENT DOCUMENTS

| | | | |
|---|---|---|---|
| 3,554,468 A | 1/1971 | McVicar | |
| 3,598,440 A | 8/1971 | Ramsden et al. | |
| 3,601,342 A | 8/1971 | Piasecki | |
| 3,602,544 A | 8/1971 | Marsh | |
| 3,656,796 A | 4/1972 | Cook | |
| 3,690,602 A | 9/1972 | Marsh | |
| 3,829,052 A | 8/1974 | Flannelly | |
| 3,833,189 A | 9/1974 | Fowler et al. | |
| 3,838,836 A | 10/1974 | Asseo et al. | |
| 3,904,156 A | 9/1975 | Smith | |
| 3,946,971 A * | 3/1976 | Chadwick | B64D 1/08 |
| | | | 244/137.4 |
| 4,124,181 A | 11/1978 | Kolwey | |
| 4,138,078 A | 2/1979 | Hester et al. | |
| 4,267,987 A * | 5/1981 | McDonnell | B64D 39/00 |
| | | | 244/6 |
| 4,364,704 A | 12/1982 | Dreesen et al. | |
| 4,378,919 A | 4/1983 | Smith | |
| 4,553,719 A | 11/1985 | Ott | |
| 4,601,444 A | 7/1986 | Lindenbaum | |
| 4,695,012 A * | 9/1987 | Lindenbaum | B64B 1/24 |
| | | | 244/26 |
| 4,747,745 A | 5/1988 | Pippen et al. | |
| 4,826,109 A | 5/1989 | Camus | |
| 4,881,601 A | 11/1989 | Smith | |
| 4,883,184 A | 11/1989 | Albus | |
| 4,889,297 A | 12/1989 | Ikeda | |
| 4,984,757 A | 1/1991 | Hartung et al. | |
| 5,071,184 A | 12/1991 | Dessaux | |
| 5,071,573 A | 12/1991 | Coffindaffer et al. | |
| 5,125,707 A | 6/1992 | Chaen et al. | |
| 5,131,491 A * | 7/1992 | Varner | A62B 1/06 |
| | | | 182/7 |
| 5,143,326 A | 9/1992 | Parte | |
| 5,190,250 A | 3/1993 | DeLong et al. | |
| 5,249,652 A | 10/1993 | Leitzman et al. | |
| 5,273,333 A | 12/1993 | Hatfield et al. | |
| 5,299,845 A * | 4/1994 | Gabriel | B66C 1/34 |
| | | | 294/82.32 |
| 5,344,203 A | 9/1994 | Tollenaere | |
| 5,352,056 A | 10/1994 | Chandler | |
| 5,358,219 A | 10/1994 | Shenk et al. | |
| 5,443,566 A | 8/1995 | Rushmer et al. | |
| 5,451,032 A | 9/1995 | Rhoads | |
| 5,465,925 A | 11/1995 | Connolly et al. | |
| 5,499,785 A | 3/1996 | Roberts et al. | |
| 5,518,205 A | 5/1996 | Wurst et al. | |
| 5,524,870 A | 6/1996 | Tallent et al. | |
| 5,562,394 A | 10/1996 | Brown, Jr. | |
| 5,593,113 A * | 1/1997 | Cox | B66C 1/34 |
| | | | 294/82.26 |
| 5,613,722 A | 3/1997 | Fandrich et al. | |
| 5,816,636 A * | 10/1998 | Gibson | B66C 21/04 |
| | | | 294/75 |
| 5,871,249 A | 2/1999 | Williams | |
| 5,898,746 A | 4/1999 | Bäversten et al. | |
| 5,927,438 A * | 7/1999 | Ostrobrod | A62B 1/08 |
| | | | 182/7 |
| 5,961,563 A | 10/1999 | Overton | |
| 6,189,834 B1 * | 2/2001 | Dietz | B66C 1/16 |
| | | | 244/137.4 |
| 6,199,793 B1 | 3/2001 | Hainsworth et al. | |
| 6,439,407 B1 | 8/2002 | Jacoff et al. | |
| 6,533,220 B2 | 3/2003 | Schuster | |
| 6,578,796 B2 | 6/2003 | Maeda | |
| 6,708,926 B2 | 3/2004 | Bonisch | |
| 6,814,185 B1 * | 11/2004 | Ostrobrod | A62B 1/14 |
| | | | 182/191 |
| 6,983,833 B2 | 1/2006 | Ivers et al. | |
| 7,028,351 B1 | 4/2006 | Frieder et al. | |
| 7,131,515 B2 * | 11/2006 | Gartsbeyn | A62B 1/14 |
| | | | 182/5 |
| 7,267,240 B2 | 9/2007 | Maurer et al. | |
| 7,720,582 B2 | 5/2010 | Makinadjian | |
| 7,887,011 B1 | 2/2011 | Baldwin | |
| 7,948,237 B2 | 5/2011 | Kusmin et al. | |
| 8,131,384 B2 | 3/2012 | Karpman et al. | |
| 8,157,205 B2 | 4/2012 | McWhirk | |
| 8,226,042 B1 | 7/2012 | Howell et al. | |
| 8,292,229 B2 | 10/2012 | Pancotti et al. | |
| 8,413,923 B2 | 4/2013 | Brenner et al. | |
| 8,496,279 B2 | 7/2013 | Aoki | |
| 8,534,607 B2 | 9/2013 | Tardiff et al. | |
| 8,534,608 B1 | 9/2013 | Cox, IV | |
| 8,591,161 B1 * | 11/2013 | Bernhardt | G05D 1/0858 |
| | | | 414/137.1 |
| 8,840,355 B1 | 9/2014 | Kulesha | |
| 8,886,402 B1 | 11/2014 | Lou | |
| 8,888,048 B2 | 11/2014 | Figoureaux et al. | |
| 8,894,050 B2 | 11/2014 | Wootten et al. | |
| 8,899,903 B1 | 12/2014 | Saad et al. | |
| 8,903,568 B1 | 12/2014 | Wang et al. | |
| 8,925,901 B2 * | 1/2015 | Gaillard | B66D 3/18 |
| | | | 254/270 |
| 8,938,325 B1 * | 1/2015 | McGinnis | B66C 13/08 |
| | | | 701/4 |
| 8,967,533 B2 | 3/2015 | DeVaul et al. | |
| 9,027,976 B1 * | 5/2015 | Tollenaere | B66C 1/127 |
| | | | 294/75 |
| 9,096,294 B1 | 8/2015 | Dong et al. | |
| 9,114,871 B2 | 8/2015 | Woodworth et al. | |
| 9,194,977 B1 | 11/2015 | Dungan et al. | |
| 9,205,922 B1 * | 12/2015 | Bouwer | B64C 37/02 |
| 9,223,008 B1 | 12/2015 | Hartman et al. | |
| 9,242,741 B1 | 1/2016 | Cockell, II | |
| 9,302,770 B2 | 4/2016 | Burgess et al. | |
| 9,422,139 B1 | 8/2016 | Bialkowski et al. | |
| 9,676,481 B1 | 6/2017 | Buchmueller | |
| 9,688,404 B1 | 6/2017 | Buchmueller et al. | |
| 9,800,091 B2 | 10/2017 | Nugent, Jr. et al. | |
| 9,836,063 B1 | 12/2017 | Bonawitz et al. | |
| 9,850,113 B2 * | 12/2017 | Melin | B66D 1/7415 |
| 9,881,506 B1 | 1/2018 | Gentry | |
| 62,627,920 | 2/2018 | Sikora | |
| 9,908,756 B2 | 3/2018 | Heravi et al. | |
| 10,023,312 B2 | 7/2018 | Repp et al. | |
| 10,023,313 B2 | 7/2018 | Behrens et al. | |
| 10,071,804 B1 | 9/2018 | Buchmueller et al. | |
| 62,757,414 | 11/2018 | Vita | |
| 62,804,020 | 2/2019 | Sikora | |
| 62,810,875 | 2/2019 | Sikora | |
| 62,833,394 | 4/2019 | Sikora | |
| 10,288,075 B2 | 5/2019 | Ishiba | |
| 62,876,721 | 7/2019 | Carr | |
| 10,451,504 B2 | 10/2019 | Campbell et al. | |
| 10,479,503 B2 * | 11/2019 | Sikora | B64D 9/00 |
| 62,940,155 | 11/2019 | Sikora | |
| 62,966,851 | 1/2020 | Sikora | |
| 16,847,448 | 4/2020 | Sikora | |
| 10,676,190 B2 | 6/2020 | Mitchell et al. | |
| 10,870,558 B2 * | 12/2020 | Sikora | A61G 3/006 |
| 10,899,586 B2 | 1/2021 | Cranney, III | |
| 10,918,892 B2 * | 2/2021 | Dickson | A62B 1/14 |
| 10,940,061 B2 | 3/2021 | Sikora et al. | |
| 11,008,198 B2 | 5/2021 | Sikora et al. | |
| 11,142,316 B2 * | 10/2021 | Sikora | B64D 1/22 |
| 11,142,433 B2 * | 10/2021 | Sikora | B66C 13/08 |
| 11,209,836 B1 | 12/2021 | Sikora et al. | |
| 11,339,034 B2 | 5/2022 | Sikora et al. | |
| 17,748,985 | 5/2022 | Sikora | |
| 17,750,015 | 5/2022 | Sikora | |
| 17,752,509 | 5/2022 | Sikora | |
| 17,875,873 | 7/2022 | Sikora | |
| 2002/0113448 A1 * | 8/2002 | Kazerooni | B66D 3/18 |
| | | | 294/106 |
| 2003/0085319 A1 | 5/2003 | Wagner et al. | |
| 2003/0222177 A1 | 12/2003 | Bonisch | |
| 2004/0026349 A1 | 2/2004 | Colgate et al. | |
| 2004/0032140 A1 | 2/2004 | Solstad | |
| 2005/0072965 A1 | 4/2005 | Sanders et al. | |
| 2005/0242237 A1 | 11/2005 | Scott | |
| 2006/0163892 A1 * | 7/2006 | Nguyen | B66C 1/48 |
| | | | 294/103.1 |

(56) References Cited

U.S. PATENT DOCUMENTS

| | | |
|---|---|---|
| 2007/0200032 A1 | 8/2007 | Eadie et al. |
| 2009/0004004 A1 | 1/2009 | Vincenzi |
| 2009/0152391 A1 | 6/2009 | McWhirk |
| 2010/0012771 A1 | 1/2010 | Jess |
| 2010/0176618 A1 | 7/2010 | Souke et al. |
| 2010/0291707 A1 | 11/2010 | Mirkin et al. |
| 2010/0319910 A1 | 12/2010 | Ives et al. |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0031683 A1 | 2/2016 | Fenker et al. |
| 2016/0048131 A1 | 2/2016 | Lesperance et al. |
| 2016/0236779 A1* | 8/2016 | Thomas ............... B64D 1/22 |
| 2016/0297650 A1* | 10/2016 | Bang ............... B66C 13/085 |
| 2016/0332728 A1 | 11/2016 | Winfree et al. |
| 2016/0340030 A1 | 11/2016 | Waltner et al. |
| 2016/0340035 A1 | 11/2016 | Duru |
| 2016/0340039 A1 | 11/2016 | Waltner et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1* | 10/2017 | Veronesi ............... B66C 23/18 |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0241267 A1* | 8/2019 | Sikora ............... B66C 13/063 |
| 2019/0337776 A1 | 11/2019 | Fanello et al. |
| 2020/0087121 A1 | 3/2020 | Ohayon et al. |
| 2020/0180763 A1 | 6/2020 | Schütz et al. |
| 2020/0182252 A1 | 6/2020 | Nakasuji et al. |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |

FOREIGN PATENT DOCUMENTS

| | | |
|---|---|---|
| AE | P60009562022 | 5/2022 |
| AU | 2020223104 A1 | 9/2021 |
| AU | 2020316044 A1 | 2/2022 |
| AU | 2019217244 C1 | 3/2022 |
| AU | 2020391500 A1 | 6/2022 |
| AU | 2020394206 A1 | 6/2022 |
| CA | 3148446 A1 | 1/2021 |
| CA | 3159310 | 5/2022 |
| CA | 3159437 | 5/2022 |
| CN | 114423703 A | 4/2022 |
| DK | 201900074 U1 | 6/2022 |
| EP | 0606108 A1 | 7/1994 |
| EP | 3749604 | 8/2020 |
| EP | 3924251 A1 | 12/2021 |
| EP | 3999463 A1 | 5/2022 |
| EP | 208930347 | 5/2022 |
| EP | 208930354 | 5/2022 |
| GB | 2327657 A | 2/1999 |
| GB | 2457149 A | 8/2009 |
| GB | 2513646 A | 11/2014 |
| GB | 2513646 B | 11/2014 |
| GB | 2513646 B | 8/2017 |
| IN | 202217035319 | 6/2022 |
| IN | 202217036526 | 6/2022 |
| IR | 14005014000300827 | 1/2022 |
| JP | H04256686 A | 9/1992 |
| JP | 04256686 | 11/1992 |
| JP | 07179288 | 7/1995 |
| JP | H07179288 A | 7/1995 |
| JP | 09317795 A | 12/1997 |
| JP | H09317795 A | 12/1997 |
| JP | 10305989 | 11/1998 |
| JP | H10305989 A | 11/1998 |
| JP | H1111859 A | 1/1999 |
| JP | 2013203394 A | 10/2013 |
| JP | 2016210607 A | 12/2016 |
| JP | 2017500257 A | 1/2017 |
| JP | 2018140860 A | 9/2018 |
| JP | 2021011386 A | 2/2021 |
| JP | 2022529961 A | 6/2022 |
| JP | 2022530316 A | 6/2022 |
| KR | 1020227021644 | 6/2022 |
| KR | 1020227021645 | 6/2022 |
| NO | 20171181 A1 | 1/2019 |
| RU | 2022101373 | 1/2022 |
| WO | 2011012915 A1 | 2/2011 |
| WO | 2014076189 A1 | 5/2014 |
| WO | 2018234670 A1 | 12/2018 |
| WO | 2019156782 A1 | 8/2019 |
| WO | 2020167867 A1 | 8/2020 |
| WO | 2020176665 A1 | 9/2020 |
| WO | 2021016277 A1 | 1/2021 |
| WO | 2021108703 A1 | 6/2021 |
| WO | 2021108714 A1 | 6/2021 |

OTHER PUBLICATIONS

International Search Report dated Apr. 30, 2020, for PCT/US2020/017790, filed Feb. 11, 2020.

Written Opinion dated Apr. 3, 2019, for PCT/US19/13603 filed Jan. 15, 2019.

Written Opinion dated Apr. 30, 2020, for PCT/US2020/017790, filed Feb. 11, 2020.

Young, L.A., "Enhanced Rescue Life Capability," 63rd Annual forum of the AHS International, Virginia Beach, VA, May 1-3, 2007 (May 2007). Fig. 2, 5, 12, 16, Abstract pp. 6-12.

International Search Report dated May 27, 2020, for PCT/US20/19967 filed Feb. 26, 2020.

Written Opinion dated May 27, 2020, for PCT/US20/19967 Filed Feb. 26, 2020.

All pages, Written Opinion dated Apr. 30, 2020 for PCT Application No. PCT/US2020/017790, filed Feb. 11, 2020.

Extended European Search Report and Search Opinion, Application No. EP 19 751 097.7, dated Aug. 31, 2021, 15 pages.

Internal Search Report dated Apr. 30, 2020 for PCT/US2020/017790, filed Feb. 11, 2020.

International Search Report in PCT/US2020/062414, dated Feb. 19, 2021, entire document.

International Search Report dated Oct. 6, 2020, for PCT/US2020/042936, filed Jul. 2020.

Phillip J. McKerrow, The design of a tethered aerial robot, Faculty of Informatics—Papers (Archive) Faculty of Engineering and

(56) References Cited

OTHER PUBLICATIONS

InformationSciences University of Wollongong, Oct. 4, 2007, pp. 1-8, University of Wollongong, Australia, https://ro.uow.edu.au/infopapers/519.

Written Opinion in PCT/US2020/062414, dated Feb. 19, 2021, entire document.

Written Opinion dated Oct. 6, 2020 for PCT/US2020/042936 filed Jul. 21, 2020.

* cited by examiner

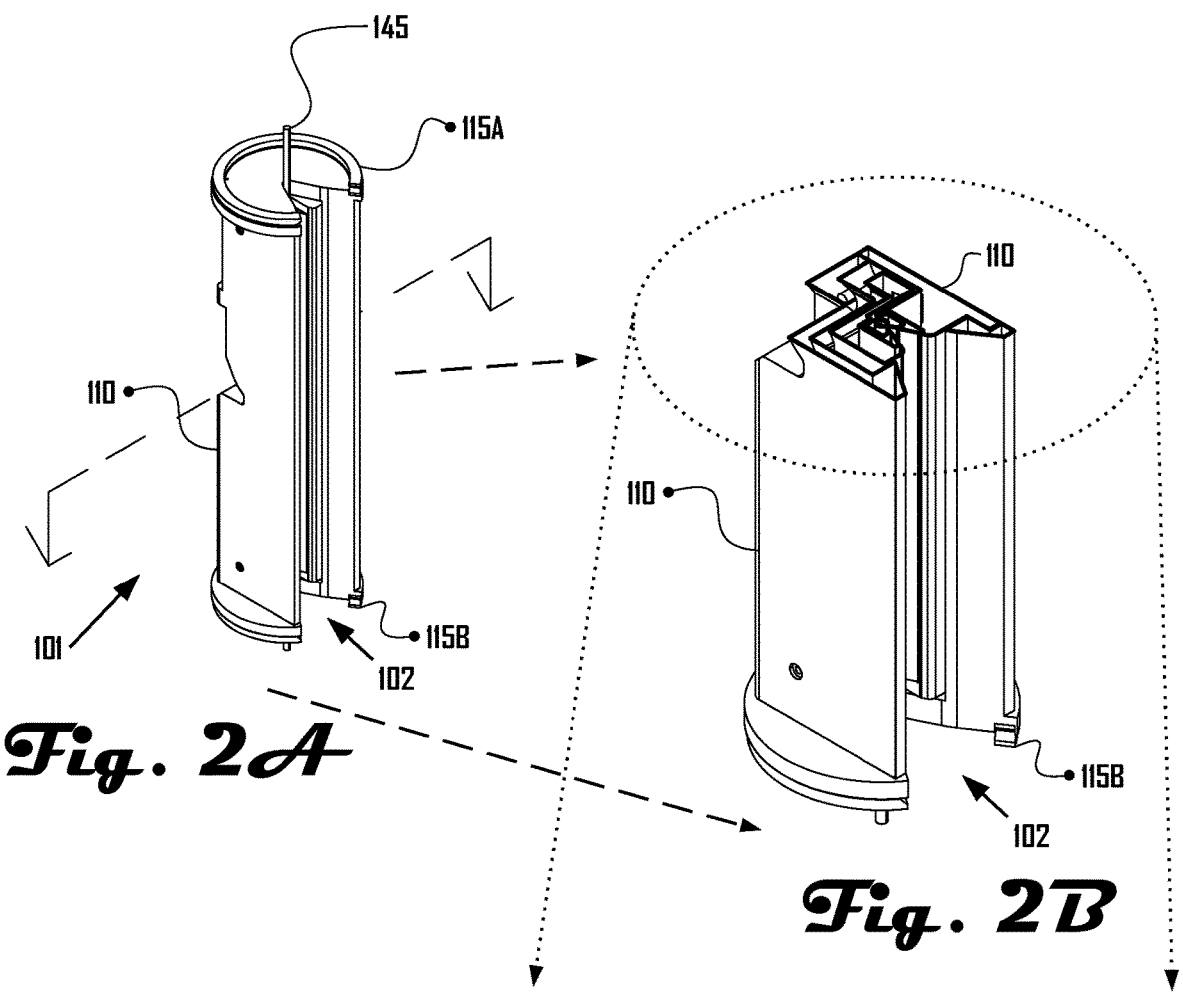
Fig. 2A
Fig. 2B
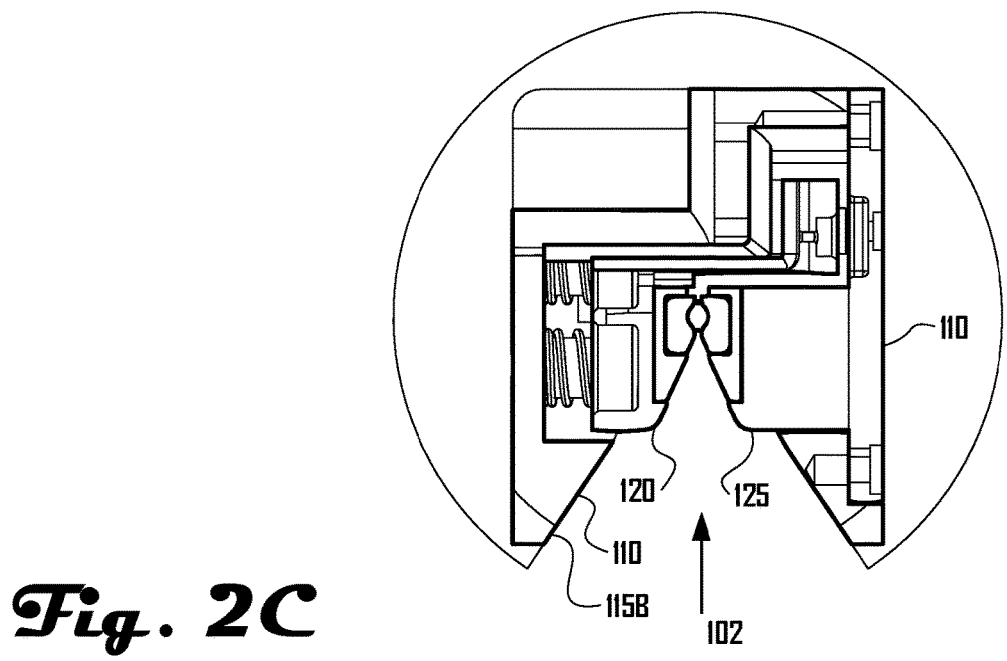
Fig. 2C

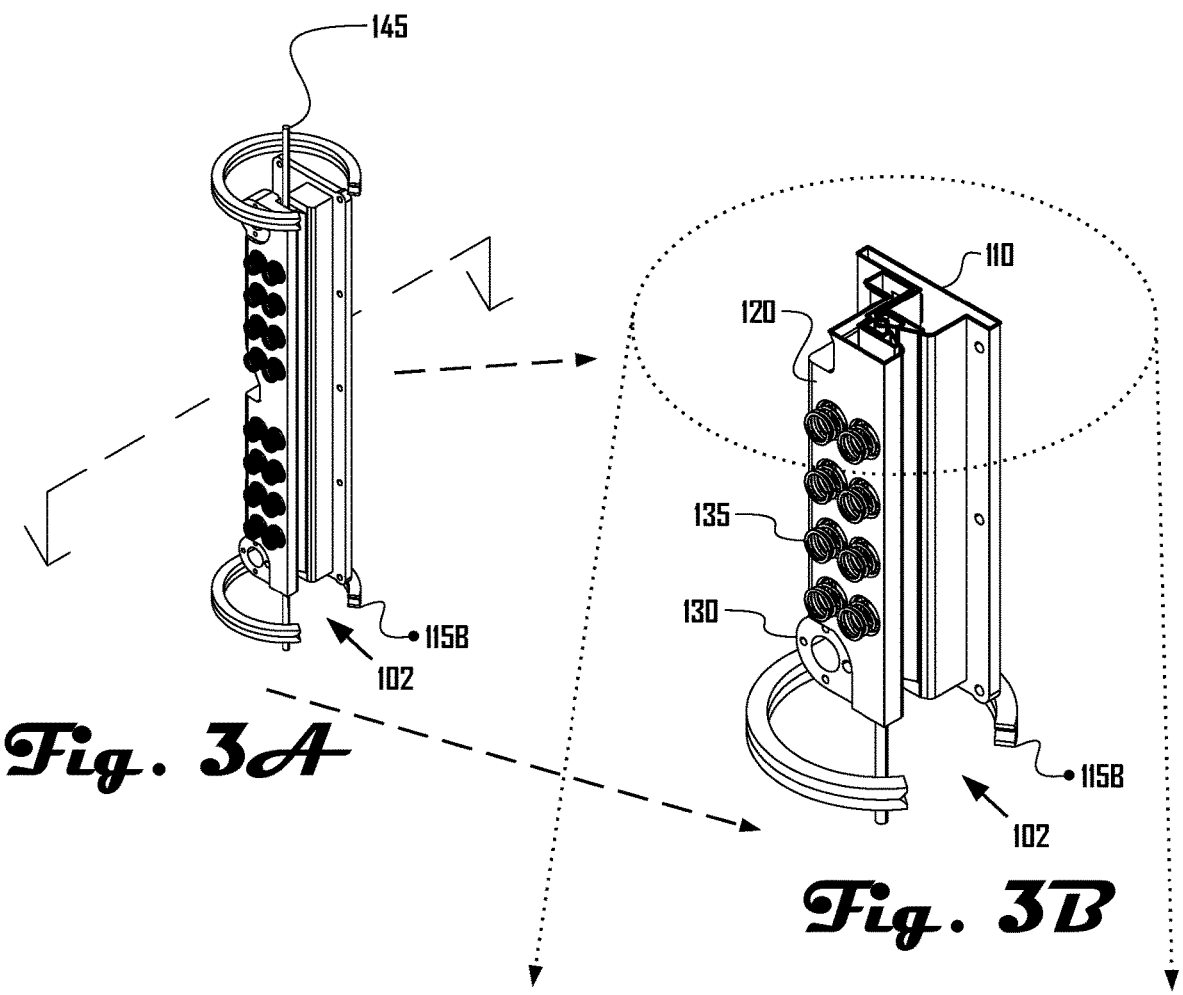
Fig. 3A
Fig. 3B
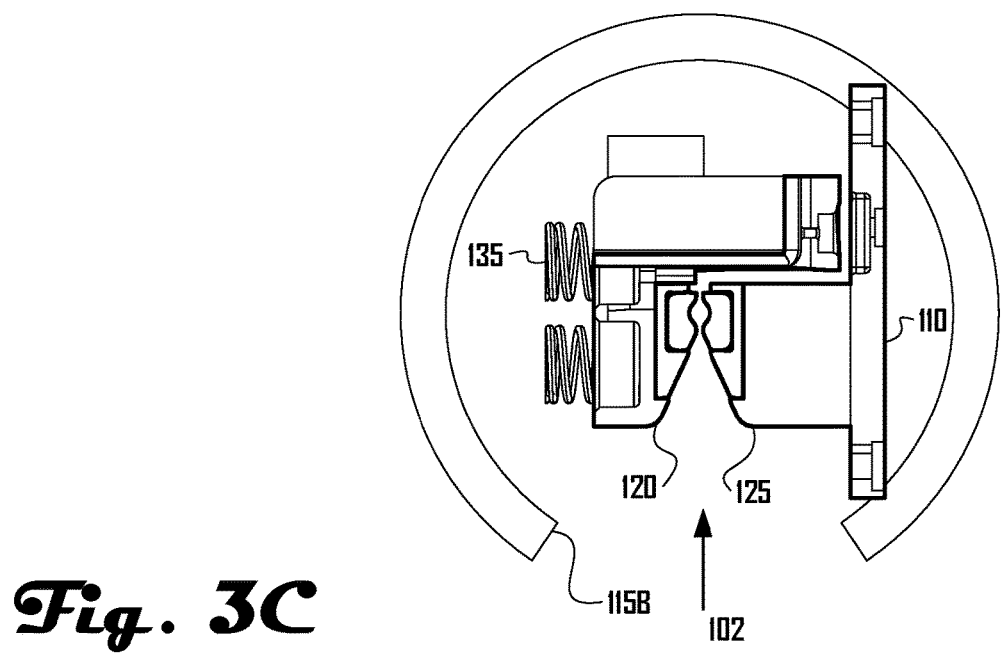
Fig. 3C

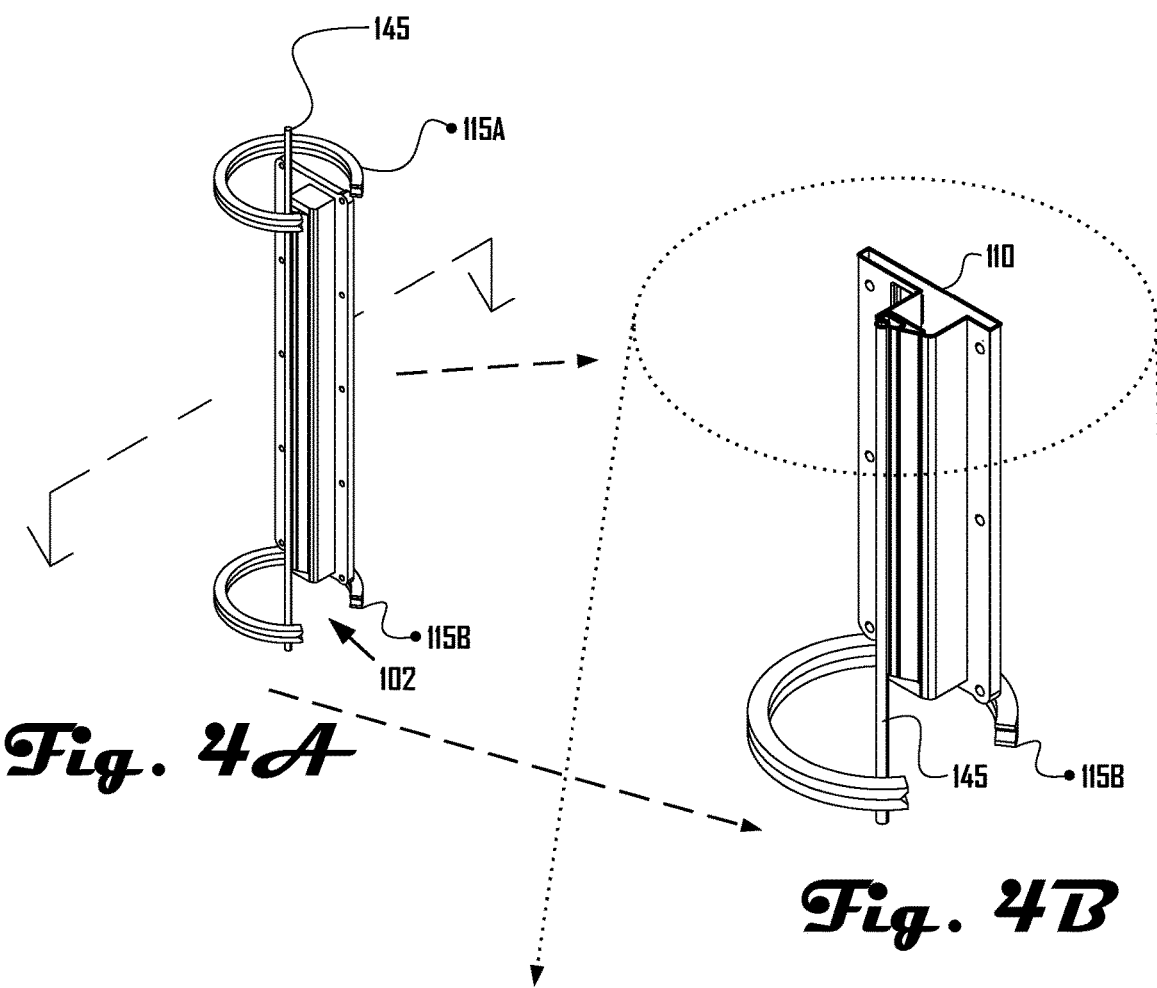
Fig. 4A
Fig. 4B
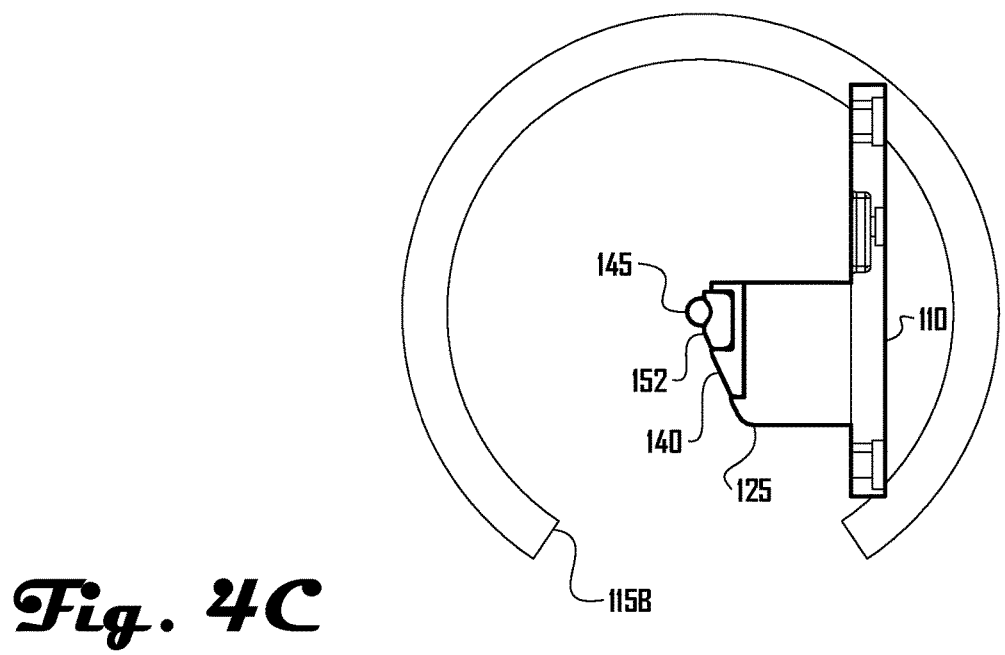
Fig. 4C

CABLE DEPLOYMENT APPARATUS, SYSTEM, AND METHODS FOR SUSPENDED LOAD CONTROL EQUIPMENT

CROSS-REFERENCE TO RELATED APPLICATIONS

This is a non-provisional of and claims the benefit of the filing date of U.S. provisional patent application No. 62/810,875, filed 2019-02-26 (YYYY-MM-DD).

FIELD

This disclosure is directed to improved systems and methods for and related to a cable connection apparatus to facilitate deployment of a system that controls suspended loads, such as loads suspended by cable from helicopters, cranes, or the like.

BACKGROUND

People and/or equipment ("loads") may be transported to or from a location as a load suspended by a cable from a helicopter or crane, using a hoist system. Loads are generally not buoyant. Cranes, helicopters, and other structures capable of carrying a load with a hoist system may be referred to herein as "carriers". During such operations, loads are subject to winds and other external and internal factors that may cause the load to move in an unstable or hazardous manner.

When deploying equipment from a carrier, such as onto a suspension cable that may support a load (also referred to as a "cable"), the person and/or equipment tasked with this job may be subject to hazards, such height, a requirement to lean out of an enclosure of the carrier—such as over skids, pontoons, wheels, landing gear, or the like—movement of the carrier, movement of other occupants of the carrier, steps required to deploy the equipment, failure of the deployment system, failure of the deployed equipment, loud noise, wind, rain, snow, and other environmental conditions.

In addition, equipment may fall from a carrier or from a suspension cable in an undesired manner or circumstance. Loss of equipment from a carrier or suspension cable may jeopardize a mission and result in delays, increased risk, increased costs, injury, and death. Falling equipment may cause injury, death, and property loss to those on the ground and to those who may rely on the equipment to complete a mission. Weight and volume of equipment in a carrier must also be reduced to reduce fuel consumption, increase speed of the carrier, reduce loss of space within the carrier, and the like.

Equipment in or deployed from a carrier may be more functional if its behavior includes complex actions; however, complex actions may also result in undesired interactions with a highly variable and unpredictable environment in and near a carrier. Training in use of equipment in a carrier is expensive. Complexity of equipment in a carrier—including equipment used to deploy other equipment—must be reduced to a minimum, while also achieving desired functions.

Operators of carriers, such as helicopter crews, crane crews, and robotic systems may use equipment that provides control of a suspended load, including equipment that provides suspended load control remote from the carrier, e.g. at or near a load, using remotely powered fans.

In hoist and sling operations, observed motion of suspended loads includes the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Y axis) may also occur, though if a load is suspended by a cable and is not buoyant, the typical motions are vertical translation, horizontal translation, and yaw. Axis, when discussed herein, are relative to a normal axis of a suspended load. Vertical and horizontal translation may be caused by movement of the suspension cable, such as by movement of the carrier, pulling in or paying out the suspension cable, movement of the load, movement of a center of gravity of the load, differences in momentum between the load and the carrier, as well as by wind—including propeller wash—impacts, and external forces. Horizontal translation can manifest as lateral motion or as or conical pendulum motion of the load, with the pivot point of the pendulum being where the cable is secured to the carrier ("pendular motion"); pendular motion generally also includes a component of vertical translation.

Yaw, lateral motion, and pendular motion can complicate lift operations, cause delays, and can lead to death of aircrew, crane operators, and of people on the ground. Yaw can produce dizziness and disorientation in humans. Yaw and lateral and pendular motion can also interfere with bringing a load into or delivering a load to a location. For example, delivery of a load to a deck of a ship may be significantly complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may accelerate or grow more pronounced as a load is drawn up to the carrier and the suspension cable shortens. Horizontal and pendular motion of a load can also interact with the carrier to produce dangerous or undesired reactive or sympathetic motion in the carrier.

In addition, some suspended load operations may involve an obstacle, such as a surface, cliff wall, building, bridge, tree limb, overhang, or other obstacle that may interfere with one or more of carrier, load, and/or suspension cable. It may be desirable to move the load relative to such an obstacle, or for other reasons, in a manner which does not involve the load hanging at a lowest energy position below the carrier.

Use of equipment to provide control of a suspended load may be improved, made less hazardous, or made more likely if systems and methods are provided to allow such equipment to be deployed, used, recovered, and handled with minimum demands placed on the party tasked with deploying the equipment.

BRIEF DESCRIPTION OF THE DRAWINGS

The sheets comprising FIGS. 1A to 4C, a first figure group, illustrate a deployment system for a suspended load control system ("SLCS"), in accordance with an embodiment. The sheets comprising FIGS. 5A to 10B, a second figure group, illustrate an SLCS with a deployment system, in accordance with an embodiment. The first and second figure groups on these sheets may be viewed in a "flip-book" fashion; each sheet within a figure group places the figures in the same position on the page relative to other sheets in the figure group (subject to the vagaries of the USPTO's image capture system). Successive figures on each sheet hide or show components, to illustrate remaining components.

FIG. 2A is an isometric parallel projection view of the deployment system of FIG. 1A with components hidden relative to FIG. 1A, in accordance with an embodiment.

FIG. 2B is an isometric detail view of the deployment system of FIG. 2A, with a horizontal cross-section view across a midline of the deployment system.

FIG. 2C is a top plan view of the deployment system of FIG. 2A, looking down on the horizontal cross-section of FIG. 2B.

FIG. 3A is an isometric parallel projection view of the deployment system of FIG. 1A with additional components hidden relative to FIG. 2A, in accordance with an embodiment.

FIG. 3B is an isometric detail view of the deployment system of FIG. 3A, with a horizontal cross-section view across a midline of the deployment system.

FIG. 3C is a top plan view of the deployment system of FIG. 3A, looking down on the horizontal cross-section of FIG. 3B.

FIG. 4A is an isometric parallel projection view of the deployment system of FIG. 1A with additional components hidden relative to FIG. 3A, in accordance with an embodiment.

FIG. 4B is an isometric detail view of the deployment system of FIG. 4A, with a horizontal cross-section view across a midline of the deployment system.

FIG. 4C is a top plan view of the deployment system of FIG. 4A, looking down on the horizontal cross-section of FIG. 4B.

DETAILED DESCRIPTION

Figure 1A:
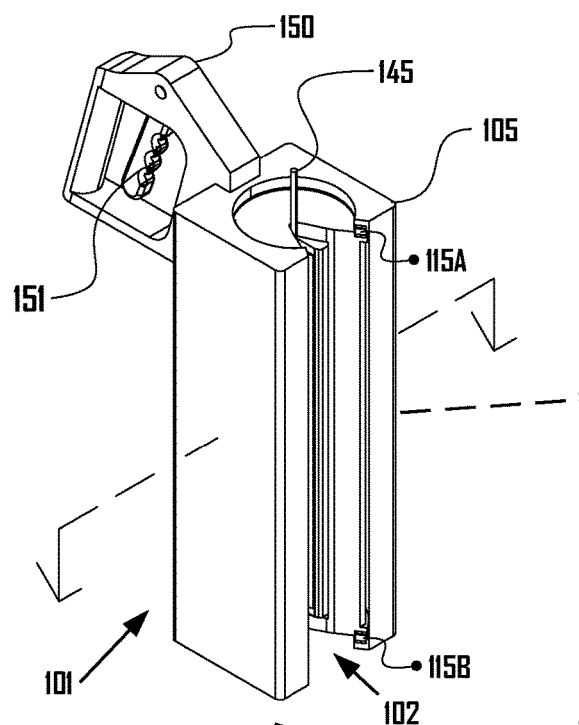
FIG. 1A is an isometric parallel projection view of a deployment system for a suspended load control system ("SLCS"), in accordance with an embodiment.

It is intended that the terminology used in the description presented below be interpreted in its broadest reasonable manner, even though it is being used in conjunction with a detailed description of certain examples of the technology. Although certain terms may be emphasized below, any terminology intended to be interpreted in a restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "coupled," or any variant thereof means any coupling, either direct or indirect between two or more elements; a coupling between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. References may be made herein to modules, routines, and subroutines; generally, it should be understood that a module or routine is a software program executed by computer hardware and that a subroutine is a software program executed within a module or routine. However, modules or routine discussed herein may be executed within another module or routine and submodules or subroutines may be executed independently (modules or routines may be submodules or subroutines and visa versa).

As used herein, "releasable," "connect," "connected," "connectable," "disconnect," "disconnected," and "disconnectable" refers to two or more structures which may be connected or disconnected, generally without the use of tools (examples of tools including screwdrivers, pliers, wrenches, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Approaches to control suspended loads include countermeasures installed on a carrier. For example, some airframes, such as the Skycrane™, have a rail system installed beneath a cabin to mitigate sway of a load, though, being remote from the suspended load, such rail system has margin effect. Some approaches to this problem involve automated countering algorithms in an aircraft's stability augmentation system, though, again, the effect of these measures is limited. At times, crew chiefs who remain within a helicopter during an extraction try to affect a suspended load by pushing or pulling a suspension cable from the helicopter; such efforts have limited effect and can be hazardous. Crane operators may move loads at slow rates to minimize horizontal or pendular motion or may use additional suspension cables or dedicated control cables (whether on the ground, neighboring structures, or on the crane); these measures increase costs, complexity, and risk of failure. All of these measures are inadequate and highly problematic.

In various embodiments, as described further herein, a suspended load control system provides control of a load, independent from a carrier. The suspended load control system or suspended load stability system (referred to together as, "SLCS") of this disclosure controls a load by exerting force from thrusters, fans, or propellers, as are found, for example, in electric ducted fans at, or near, a location of the load. Thrusters, fans, propellers and electric ducted fans are referred to herein as "EDFs". Vector thrust force produced by the EDFs may be used to counteract yaw and pendular motion, may be used to translate a load horizontally, such as to avoid an obstacle or to move a load into an offset position relative to a normal lowest-energy hanging position, or may otherwise be used to control the fine location and rotation of a load, independently from the carrier. Consequently, an SLCS enhances mission safety and improves performance of carrier and load operations as the SLCS dynamically controls fine location and rotation of a load, separate from motion of the carrier.

Once deployed and in-use, the SLCS may be agnostic with respect to the platform from which the load is suspended (e.g., the characteristics of a helicopter "ownship", or a crane, etc.), as it independently determines the thrust necessary to stabilize the load or to direct the load in a desired direction. This permits widespread adoption of the system regardless of carrier type, lowering cost and mitigating solution risks.

An SLCS can provide benefits to, for example, helicopter search and rescue ("SAR") and sling load operations, forest fire helicopters, crane operations, construction sling load operations, and civilian firefighting.

However, the SLCS may itself need to be deployed from a carrier. Deployment may involve a multi-step process. In an early step in this process, a rescue diver and/or a litter, chair, sling or the like may be clipped or otherwise secured to a suspension cable. The securement point to the suspension cable may include a pivot to allow the load to rotate without imparting significant rotational force on the suspension cable. The rescue diver, litter, chair or the like then steps out of or may otherwise be released or disengaged from the carrier to be suspended by the suspension cable. A rescue diver or another party may then be tasked with securing the SLCS to the suspension cable above the level of the rescue diver and/or litter. The secured SLCS must be secured to the suspension cable, but it may also need to be removed. Securement and removal of the SLCS must be easy. Securement of an SLCS to a cable should not fail in an undesired manner.

An SLCS secured to a cable may, for example, rotate, as it controls motion of the load; however, rotation of the suspension cable may not be desirable. For example, a braided cable may unwind or may develop over-winding kinks as it is rotated, either of which can result in problems that range from endangering a mission to catastrophic failure of equipment, including of the suspension cable. Securement of an SLCS to the cable may be below the pivot. However, certain SLCS deployments may not allow a pivot to be inserted between the top of the SLCS and the suspension cable; for example, a deployment may require that an SLCS be attached to the suspension cable, above a level of a load (the rescue diver, etc.) that is attached to a bottom of the suspension cable. In such deployments, the deployed SLCS must be both securely attached to the suspension cable, while also being able to rotate around the suspension cable, without imparting a significant rotational force on the suspension cable to avoid unwinding or over-winding the suspension cable as the SLCS rotates to control the suspended load.

Disclosed are systems and methods to deploy an SLCS onto a suspension cable, while optionally allowing the SLCS to rotate about the suspension cable, without imparting a significant rotational force on the suspension cable from rotation of the SLCS.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load, search and rescue operations, and/or crane operations. However, these embodiments are illustrative examples and in no way limit the disclosed technology to any particular application or platform.

Figure 1B:
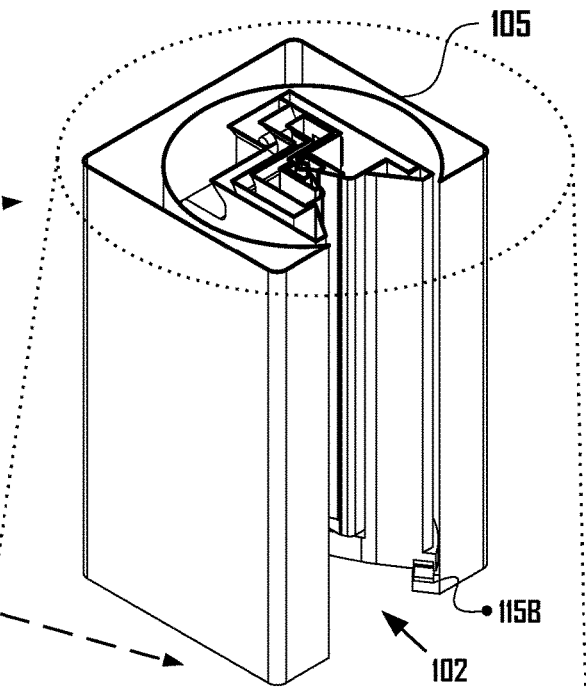
FIG. 1B is an isometric detail view of the deployment system of FIG. 1A, with a horizontal cross-section view across a midline of the deployment system.
Figure 1C:
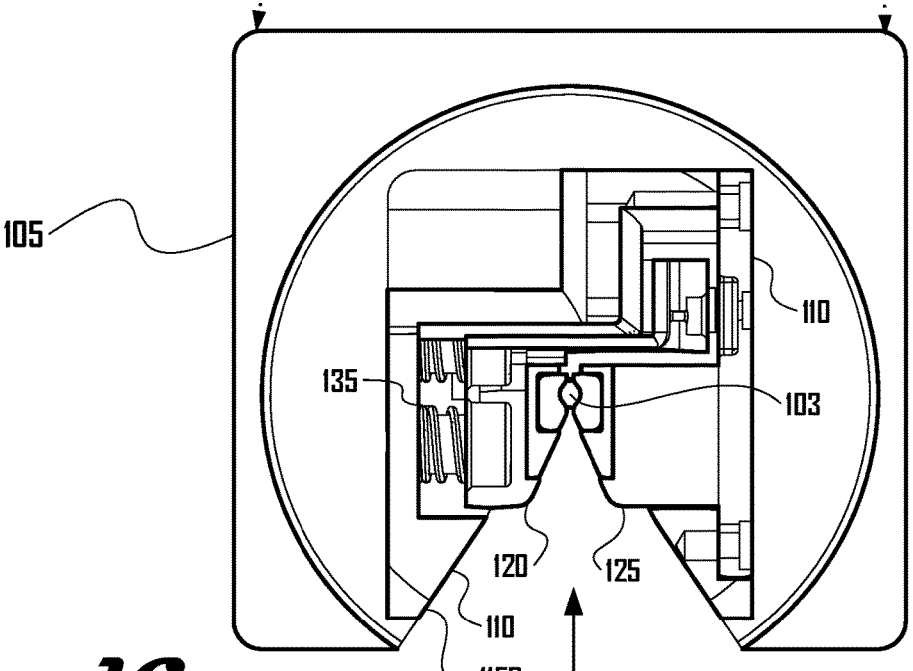
FIG. 1C is a top plan view of the deployment system of FIG. 1A, looking down on the horizontal cross-section of FIG. 1B.

FIG. 1A is an isometric parallel projection view of a deployment system 101 for a suspended load control system ("SLCS"), in accordance with an embodiment. FIG. 1B is an isometric detail view of the deployment system of FIG. 1A, with a horizontal cross section view across a midline of the deployment system. FIG. 1C is a top plan view of the deployment system of FIG. 1A, looking down on the horizontal cross-section of FIG. 1B.

Referring to FIGS. 1A to 1C, deployment system 101 may be secured to or within an SLCS, such as the SLCS of FIGS. 5A to 12B, as discussed herein. Deployment system 101 comprises cable entry channel 102, to receive a suspension cable, such as suspension cable 145. Cable entry channel 102 may be angled inward, toward cable receiving area 103. Cable entry channel 102 may comprise multiple components which form a narrowing channel approaching cable receiving area 103. Cable receiving area 103 may form a partially enclosed vertical channel between fixed jaw 125 and movable jaw 120.

Deployment system 101 further comprises springs 135 and clamp housing 110. Springs 135 may apply a force, such as compressive force, against or between movable jaw 120 and clamp housing 110. Moveable jaw 120 may move toward and away from fixed jaw 125, along a dimension of freedom defined by a sliding bracket assembly (embodiments of which are discussed and illustrated further herein). One or more of springs 135 and components with which springs 135 interact, such as movable jaw 120, fixed jaw 125, sliding bracket assembly 130, and clamp housing 110, may be referred to herein as "spring system". Compressive force from springs 135 may secure or clamp suspension cable 145 between movable jaw 120 and fixed jaw 125. Compressive force from springs 135 may occur when springs 135 are in a lower-energy state, such as when springs 135 have expanded, to compress movable jaw 120 against fixed jaw 125. When springs 135 are in the lower-energy state, they and/or the engagement mechanism of which they are a part may be referred to herein as not being "energized".

Together, fixed jaw 125 and movable jaw 120 may be understood as a "clamp" and may be referred to as a "jaw" or "jaw system" or "releasable jaw". In an alternative embodiment, the jaw system may comprise a set of levers rotatably joined at a fulcrum. When the set of levers cross at the fulcrum, e.g., as in pliers, springs may pull first ends of the levers together, drawing opposing second ends of the levers together, with clamp receiving area between the opposing second ends of the levers. When the set of levers do not cross at the fulcrum, springs may push first ends of the levers apart, pushing together opposing second ends of the lever, with clamp receiving area between the opposing second ends of the lever.

Deployment system 101 further comprises handle 150 and jaw release 151. Jaw release 151 may receive input force from an operator of deployment system 101, such as by being squeezed by the operator against handle 150. Force communicated into jaw release 151 may be transferred by a wire, cable, push-rod, hydraulic piston and hydraulic line or other force-transmitting member or conduit (not illustrated) against the force from springs 135. A rotating interface may be provided between the input force and jaw system, wherein one side of the interface is attached to bearing housing 105 and the other side is attached to clamp housing 110, allowing transfer of input force, notwithstanding that the two objects may rotate relative to one another. For example, the rotating interface may comprise a first wire or rod which passes through a circular or semi-circular bearing or the like and wherein the first wire or rod terminates at an end in a ball, sphere, bearing, or the like. The circular or semi-circular bearing or the like may be secured to a first end of a second wire or rod which proceeds to the jaw system, such that a second end of the second wire or rod engages with springs 135. When the first wire or rod is withdrawn, pushed, or the like, the ball, sphere, bearing or the like at the end of the first wire or rod may engage with the circular or semi-circular bearing or the like at the first end of the second wire or rod and transfer force from the first wire or rod to the second wire or rod, notwithstanding that at times the first and second wire or rod may rotate relative to one another. When the first and second wire or rod rotate relative to one another, they may rotate about a common axis of rotation. For example, the rotating interface may comprise a first hydraulic line and a second hydraulic line joined by a rotating junction, which rotating junction allows the first and second hydraulic lines to rotate relative to one another, such as about a common axis of rotation.

When force from the operator of deployment system 101 input into jaw release 151 is greater than force from springs 135, movable jaw 120 may move away from fixed jaw 125, expanding or opening cable receiving area 103. Jaw release 151 and spring system may be referred to herein as "engagement mechanism". In such circumstances, e.g. when force from the operator of deployment system 101 input into jaw release 151 is greater than force from springs 135, springs 135 may be compressed or "energized", as they may then be in a higher energy state than when they have expanded. Springs 135 and/or a jaw system of which they are a part may be referred to as "energized" under such circumstances. Under such circumstances, suspension cable 145, if present in the jaw system, may be released, allowing deployment system 101 and an SLCS to be released from suspension cable 145. When force from the operator of deployment system 101 is input into jaw release 151, the jaw system may open and suspension cable 145, if not present in the jaw system, may be inserted into cable entry channel 102. In embodiments in which springs 135 or equivalent provide a pulling force to pull first ends of non-crossing levers together at a fulcrum, such springs may be pushed apart by input force from jaw release 151, in which case such springs and/or a jaw system of which they are a part may be referred to as being "energized".

In an alternative embodiment, a jaw clamp may receive input force from an operator of deployment system 101, such as when the operator squeezes lever 151 against handle 150, such that the input force draws movable jaw 120 and fixed jaw 125 together, for example, to apply force to hold suspension cable 145. In such alternative embodiment, a ratchet, pawl, or other locking mechanism may secure movable jaw 120 and fixed jaw 125 together, thereby holding deployment system 101 to suspension cable 145, until the locking mechanism is released.

In an alternative embodiment, input force to/from an actuator may be communicated to the jaw system, instead of and/or in addition to input force from a human operator. Examples of actuators include electronic actuators, such as solenoids, piezo electric actuators, linear motors, rotary motors, and the like. Such an actuator may communicate with springs 135 via a jack screw or the like.

Deployment system 101 further comprises bearing housing 105 and bearing sets 115A and 115B. Bearing set 115 may hold clamp housing 110 within bearing housing 105 and may allow clamp housing 110 to rotate within bearing housing 105. Bearing set 115 may comprise, for example, needle thrust bearings, a set of thrust ball bearings and a roller bearing, spherical roller thrust bearings, and the like.

When a jaw system of a deployment system is clamped to a suspension cable, bearing set 115 may allow clamp housing 110 and a remainder of SLCS to rotate around the suspension cable, transmitting only minimal rotational force to the suspension cable; transmitted rotational force may come only from friction in the bearings in bearing set 115. In this way, the disclosed deployment system may be secured or clamped to a suspension cable, while an SLCS attached to the deployment system may rotate about the suspension cable, without imparting significant rotational force to the suspension cable. A small amount of rotational force may result from fiction in bearing set 115, but his may not be enough to cause problems with a suspension cable.

FIG. 2A is an isometric parallel projection view of deployment system 101 of FIG. 1A with components hidden relative to FIG. 1A, in accordance with an embodiment. FIG. 2B is an isometric detail view of deployment system 101 of FIG. 2A, with a horizontal cross-section view across a midline of the deployment system. FIG. 2C is a top plan view of the deployment system of FIG. 2A, looking down on the horizontal cross-section of FIG. 2B. Toggling between FIGS. 1A-1C and FIGS. 2A-2C, FIGS. 2A-2C hide bearing housing 105, to more clearly illustrate remaining components and relationship there among, such as a seating location, on top of bearing set 115A and on bottom of bearing set 115B, where bearing housing 105 is seated on bearing set 115.

FIG. 3A is an isometric parallel projection view of deployment system 101 of FIG. 1A with additional components hidden relative to FIG. 2A, in accordance with an embodiment. FIG. 3B is an isometric detail view of the deployment system of FIG. 3A, with a horizontal cross-section view across a midline of the deployment system. FIG. 3C is a top plan view of the deployment system of FIG. 3A, looking down on the horizontal cross-section of FIG. 3B. FIGS. 3A through 3C hide clamp housing 110, to more clearly illustrate remaining components and a relationship there among. For example, FIGS. 3A through 3C illustrate springs 135 as well as sliding bracket assembly 130. Sliding bracket assembly 130 secures movable jaw 120 to fixed jaw 125, while allowing movable jaw 120 to move toward and away from fixed jaw 125. Embodiments of a sliding bracket assembly, similar to sliding bracket assembly 130, is discussed further herein, such as in relation to FIGS. 10A, 10B, and 11.

FIG. 4A is an isometric parallel projection view of deployment system 101 of FIG. 1A with additional components hidden relative to FIG. 3A, in accordance with an embodiment. FIG. 4B is an isometric detail view of deployment system 101 of FIG. 4A, with a horizontal cross-section view across a midline of the deployment system. FIG. 4C is a top plan view of deployment system 101 of FIG. 4A, looking down on the horizontal cross-section of FIG. 4B. FIGS. 4A through 4C hide movable jaw 120 and springs 135 to more clearly illustrate remaining components and a relationship there among. For example, FIGS. 4A through 4C illustrate cable 145 seated, clamped, or otherwise secured against elastomer 152 and that elastomer 152 is held within elastomer shoe 140, all within fixed jaw 125. Elastomer 152 may comprise, for example, a material suited to be clamped to a suspension cable without damaging the suspension cable. Such a material may comprise, for example, an elastomer, such as polyurethane of a suitable durometer, such as 60-90a durometer; other examples may comprise rubber, butyle rubber, silicone, bronze, lead, or the like.

When viewed in conjunction with FIGS. 2A through 2C, FIGS. 4A through 4C illustrate that clamp housing 110 may comprise multiple sub-components, which sub-components may be bolted or otherwise secured together.

Figure 5A:
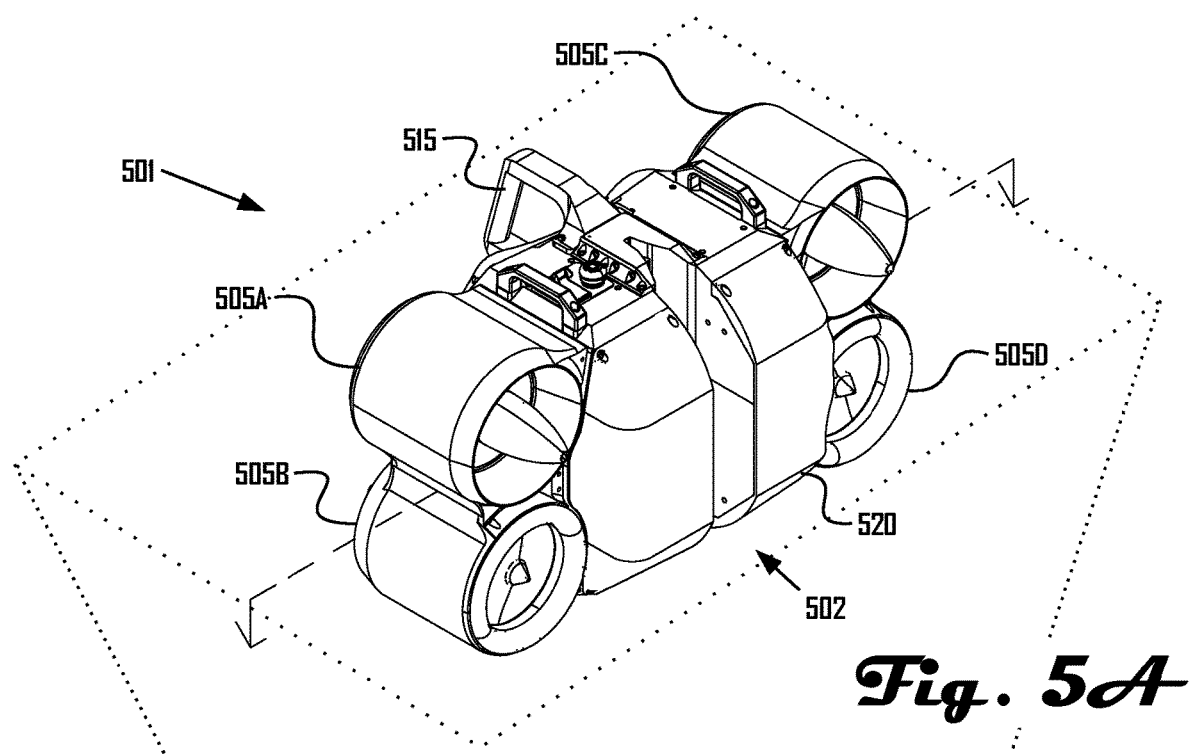
FIG. 5A is an isometric parallel projection view of a suspended load control system ("SLCS") incorporating a deployment system, in accordance with an embodiment.
Figure 5B:
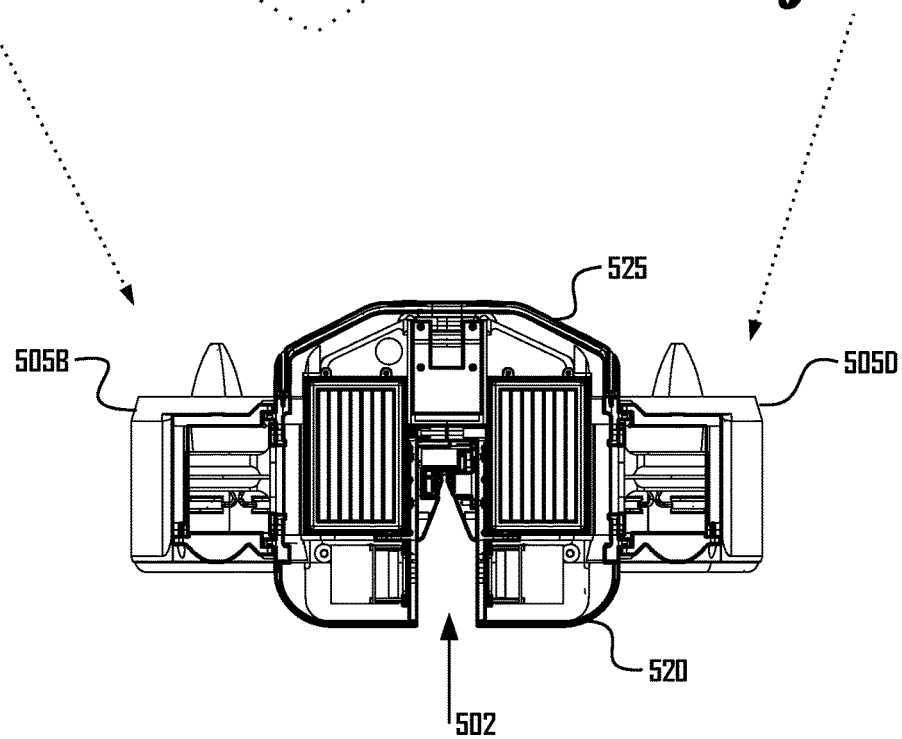
FIG. 5B is a top plan view of the suspended load control system ("SLCS") with a horizontal cross-section across a midline of the SLCS and deployment system, in accordance with an embodiment.

FIG. 5A is an isometric parallel projection view of a suspended load control system ("SLCS") incorporating a deployment system 501, in accordance with an embodiment. FIG. 5B is a top plan view of SLCS and deployment system 501 of FIG. 5A with a horizontal cross-section across a midline of SLCS and deployment system 501, in accordance with an embodiment. FIGS. 5A and 5B illustrate that SLCS and deployment system 501 may comprise, for example, fan unit 505A, fan unit 505B, fan unit 505C, and fan unit 505D. Fan units 505 may comprise a cowl which protects one or more EDF. The cowl may be hardened, to withstand impact with objects in the environment. The cowl unit may be made of metal, plastics, composite materials, including fiber reinforced resin, and the like. Fan unit 505 may include an air intake, though which air may be drawn, and an outlet. An air intake may comprise one or more screens or filters to prevent entry of some objects into EDF. The EDF in fan unit 505 may comprise blades and motor(s), such as electric motor(s). The electric motors within an EDF may be sealed against dust, sand, water, and debris.

For the sake of convenience in discussing them, fan units 505A and 505B may be considered to form a first fan unit group while fan units 505C and 505D may be considered to form a second fan unit group. The fan units in each fan unit group propel thrust fluid (such as air) in fixed directions, such as fixed directions opposite each other; e.g. offset by 180 degrees. In other embodiments, a fewer or greater number of fan units and/or EDF may be used. In other embodiments, the fan units and/or EDF may be aligned other than as illustrated, e.g., offset by greater or fewer than 180 degrees, with or without offset along other of the axis. A mechanical steering component may be included (not illustrated) to dynamically reposition a fan unit and/or EDF within a fan unit.

EDF in individual of the fan units 505 may be activated separately, with different power, to produce thrust vectoring or thrust vector control of an assembly of fan units. For example, to produce clockwise yaw (with directions relative to FIG. 5B), an EDF in fan unit 505A may be activated by itself or in conjunction with an EDF in fan unit 505D. To produce lateral translation of SLCS and deployment system 501, EDF in either i) fan units 505A and 505C or ii) fan units 505B and 505D may be activated. Simultaneous lateral translation and rotation may be produced.

SLCS and deployment system 501 comprises handle 515. Handle 515 may be used by a party tasked with deploying SLCS and deployment system 501.

SLCS and deployment system 501 comprises cable entry channel 502 to receive a suspension cable.

SLCS and deployment system 501 comprises front cover 520 and back cover 525, which may protect components within SLCS and deployment system 501.

Figure 6A:
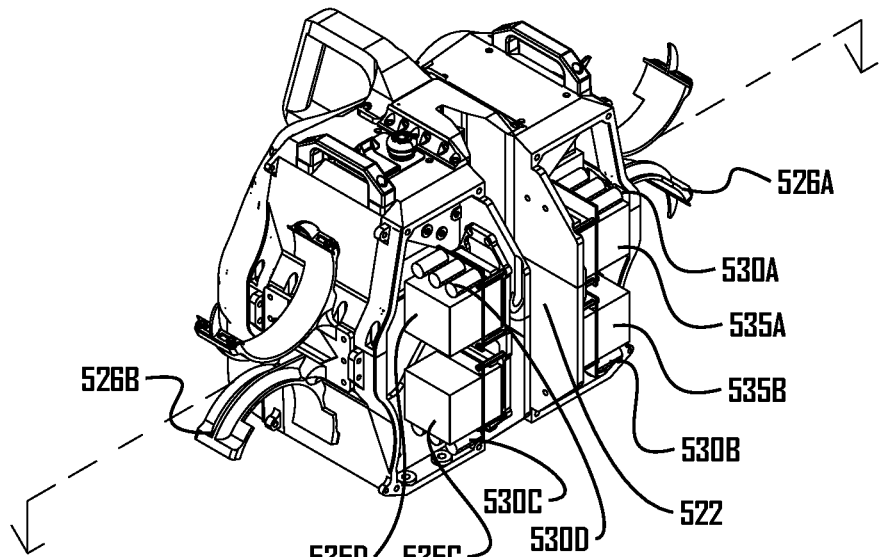
FIG. 6A is an isometric parallel projection view of the suspended load control system ("SLCS") incorporating the deployment system of FIG. 5A with components hidden relative to FIG. 5A, in accordance with an embodiment.
Figure 6B:
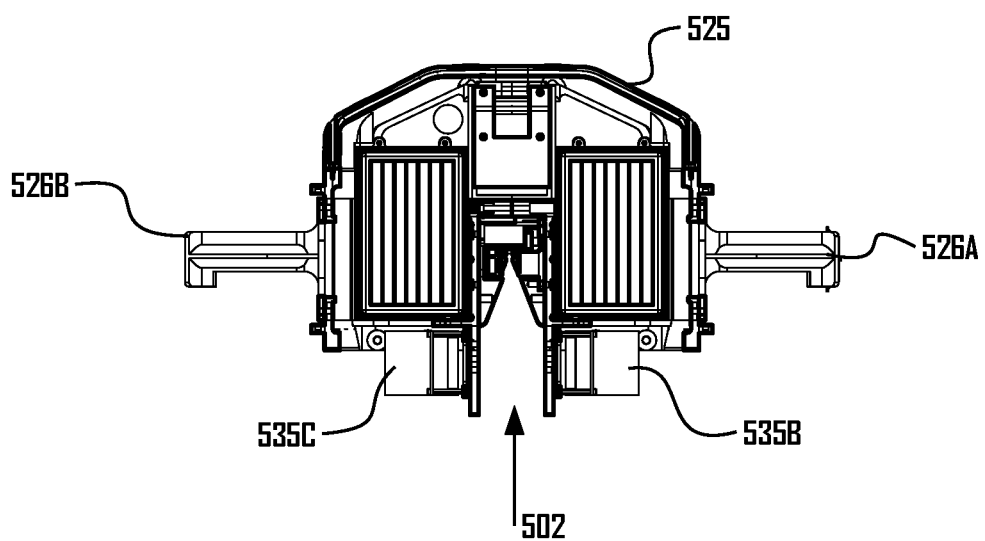
FIG. 6B is a top plan view of the suspended load control system ("SLCS") of FIG. 6A with a horizontal cross-section across the midline of the SLCS and deployment system, in accordance with an embodiment.

FIG. 6A is an isometric parallel projection view of SLCS and deployment system 501 of FIG. 5A, in accordance with an embodiment, with components hidden relative to FIG. 5A. FIG. 6B is a top plan view of SLCS and deployment system 501 of FIG. 6A with a horizontal cross-section across the midline of SLCS and deployment system 501, in accordance with an embodiment.

SLCS and deployment system 501 comprises fan unit brackets 526A and 526B, to receive and hold fan units. Additional fan unit brackets are not labeled.

SLCS and deployment system 501 comprises electrical components 530A, 530B, 530C, and 530D. In an embodiment, electrical components 530 may comprise, for example, power regulators, relays, buffers, or the like, to provide regulated power to a fan unit. In an alternative embodiment, electrical components 530 may comprise batteries, such as batteries to power a jaw driver which may move a movable jaw of SLCS and deployment system 501.

SLCS and deployment system 501 comprises electrical component boxes 535A, 535B, 535C, and 535D. In an embodiment, electrical component boxes 535 may comprise, for example, electronic speed controllers, motor drivers, and the like, to control electrical power to a fan unit. In an alternative embodiment, electrical component boxes may comprise a jaw driver, such as solenoids, linear actuators, rotary motors, and the like, to move a movable jaw of SLCS and deployment system 501.

SLCS and deployment system 501 comprises internal frame 522. Internal frame 522 may connect and hold components of SLCS and deployment system 501.

Figure 7A:
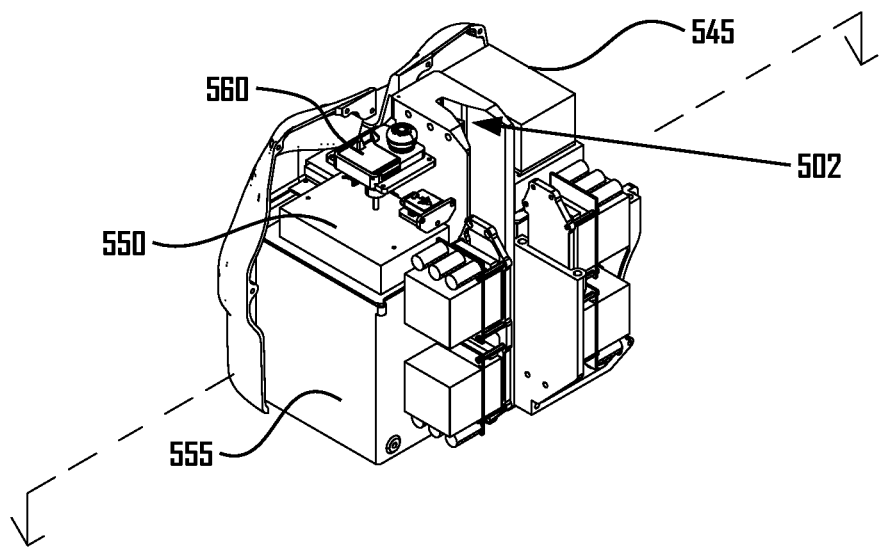
FIG. 7A is an isometric parallel projection view of the suspended load control system ("SLCS") incorporating the deployment system of FIG. 5A with additional components hidden relative to FIG. 6A, in accordance with an embodiment.
Figure 7B:
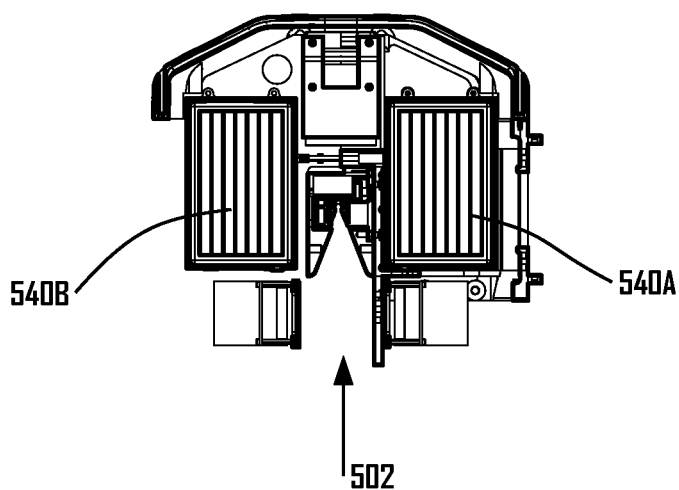
FIG. 7B is a top plan view of the suspended load control system ("SLCS") of FIG. 7A with a horizontal cross-section across the midline of the SLCS and deployment system, in accordance with an embodiment.

FIG. 7A is an isometric parallel projection view of SLCS and deployment system 501 of FIG. 5A with additional components hidden relative to FIG. 6A, in accordance with an embodiment. FIG. 7B is a top plan view of SLCS and deployment system 501 of FIG. 7A with a horizontal cross-section across the midline of SLCS and deployment system 501, in accordance with an embodiment.

SLCS and deployment system 501 may comprise processor enclosure 545, which may comprise computer processors, memory, and the like used by SLCS and deployment system 501, such as in load control system logical components 1401.

SLCS and deployment system 501 may comprise power control enclosure 550, labeled on one side of FIG. 7A; what may be an equivalent component is not labeled on the other side. Power control enclosure 550 may comprise, for example, components used in a power supply system for SLCS and deployment system 501.

SLCS and deployment system 501 comprises battery box 555, labeled on one side of FIG. 7A; what may be an equivalent component is not labeled on the other side. Battery box 555 may comprise, for example, one or more batteries, such as fan unit battery pack 540B, used to provide power to one or more fan units, such as to fan units 505A and 505B. Fan unit battery pack 540A is labeled in FIG. 7B.

Figure 8A:
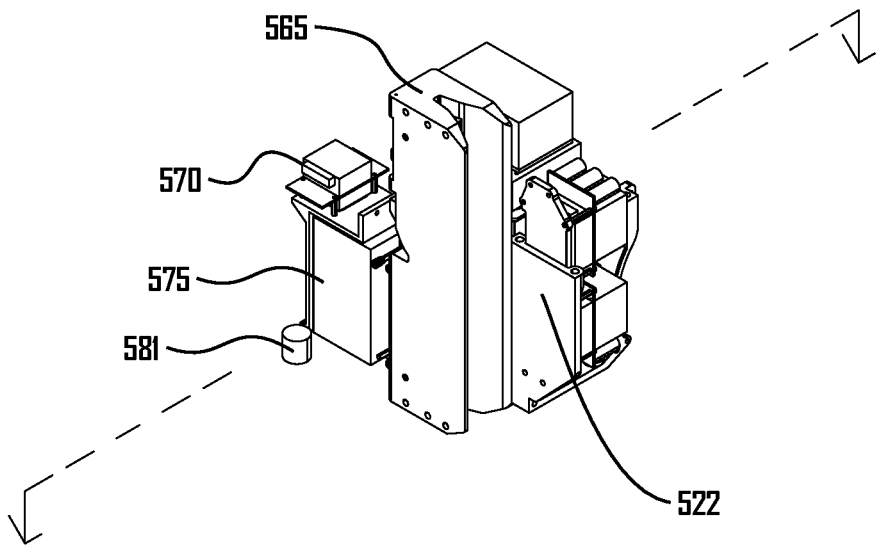
FIG. 8A is an isometric parallel projection view of the suspended load control system ("SLCS") incorporating the deployment system of FIG. 5A with additional components hidden relative to FIG. 7A, in accordance with an embodiment.
Figure 8B:
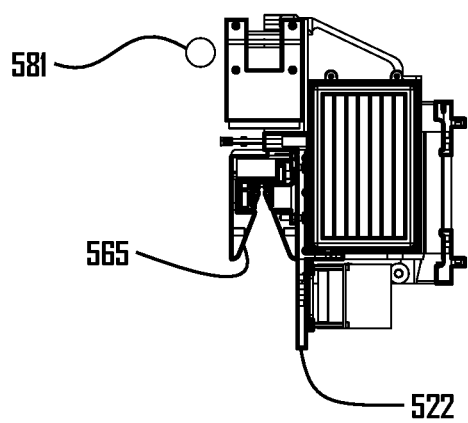
FIG. 8B is a top plan view of the suspended load control system ("SLCS") of FIG. 8A with a horizontal cross-section across the midline of the SLCS and deployment system, in accordance with an embodiment.

FIG. 8A is an isometric parallel projection view of SLCS and deployment system 501 of FIG. 5A with additional components hidden relative to FIG. 7A, in accordance with an embodiment. FIG. 8B is a top plan view of SLCS and deployment system 501 of FIG. 8A with a horizontal cross-section across the midline of SLCS and deployment system 501, in accordance with an embodiment.

SLCS and deployment system 501 may comprise clamp housing 565. Clamp housing 565 may comprise, for example, components similar to those discussed in relation to FIGS. 1A through 4C or 9A through 11 and may be similar to clamp housing 110. FIGS. 1A through 4C illustrate clamp housing 110, bearing housing 105 and bearing set 115, wherein bearing set 115 allows bearing housing 105 and clamp housing 110 to rotate relative to one another. SLCS and deployment system 501 is not illustrated with a component similar to bearing set 115. A components similar to bearing set 115 may be incorporated into SLCS and deployment system 501, such as, with reference to FIG. 13, by enlarging deployment system space 1301 within SLCS 1305, to accommodate a component that provides the same function as bearing set 115 does in deployment system 101.

SLCS and deployment system 501 may comprise power relay 570, which may serve as a power relay, and auxiliary battery box 575. Auxiliary battery box 575 may contain batteries that may provide power to SLCS and deployment system 501 separate from fan unit batteries 540, such that SLCS and deployment system 501 may be connected or disconnected from a suspension cable or may perform other functions, even if fan unit batteries 540 have been depleted.

SLCS and deployment system 501 may comprise shut-off pin assembly 581. When a pin is inserted into shut-off pin assembly 581, power may be available to flow from fan unit batteries 540. When such pin is removed from shut-off pin assembly 581, power flow from fan unit batteries 540 may be disabled.

SLCS and deployment system 501 may comprise internal frame 522, a portion of which is illustrated in FIGS. 8A and 8B and which is also discussed herein.

Figure 9A:
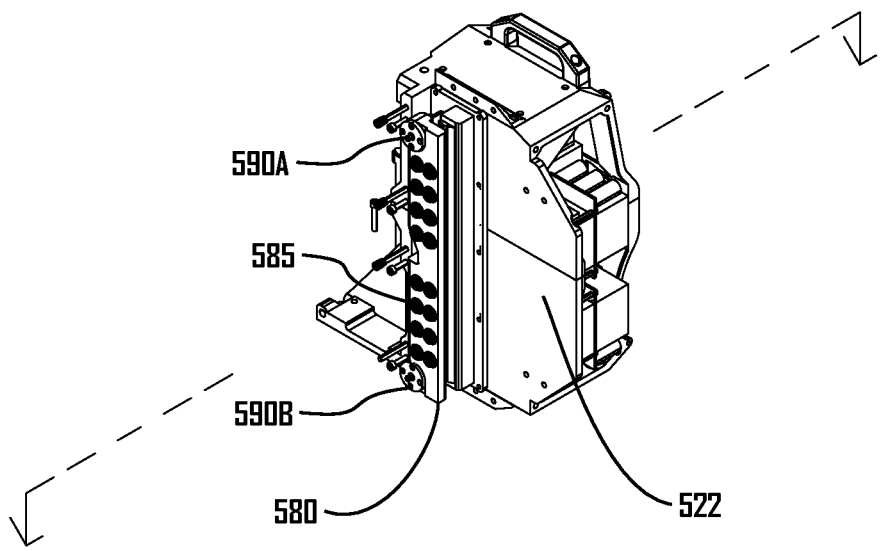
FIG. 9A is an isometric parallel projection view of the suspended load control system ("SLCS") incorporating the deployment system of FIG. 5A with additional components hidden relative to FIG. 8A, in accordance with an embodiment.
Figure 9B:
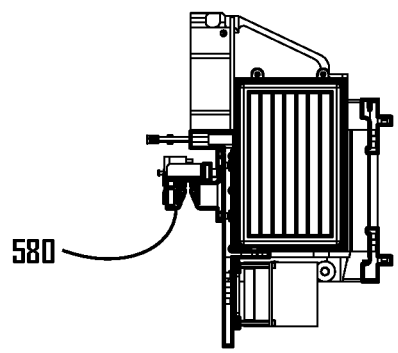
FIG. 9B is a top plan view of the suspended load control system ("SLCS") of FIG. 9A with a horizontal cross-section across the midline of the SLCS and deployment system, in accordance with an embodiment.

FIG. 9A is an isometric parallel projection view of SLCS and deployment system 501 with additional components hidden relative to FIG. 8A, in accordance with an embodiment. FIG. 9B is a top plan view of SLCS and deployment system 501 of FIG. 9A with a horizontal cross-section across the midline of the SLCS and deployment system 501, in accordance with an embodiment.

SLCS and deployment system 501 may comprise springs 585. Springs 585 may be similar to springs 135. Springs 585 may apply a force against movable jaw 580 and clamp housing 565. Moveable jaw 580 may move toward and away from fixed jaw 595 (labeled in FIGS. 10A and 10B), along a dimension of freedom defined by a sliding bracket assembly (embodiments of which are discussed and illustrated further herein). Compressive force from springs 585 may secure or clamp a suspension cable between movable jaw 580 and fixed jaw 595.

Together, fixed jaw 595 and movable jaw 580 may be understood as a "clamp" and may be referred to as a "jaw" or "jaw system". In an alternative embodiment, the jaw system may comprise a set of levers joined at a fulcrum, similar to the levers and fulcrum discussed herein.

Force produced by a motor or actuator, as may be found in, for example, electrical component box 535, may be transferred by a wire, cable, push-rod, hydraulic piston and hydraulic line or other force-transmitting member or conduit, not illustrated, against force from springs 585. In an alternative embodiment, not illustrated, force against force from springs 585 may be provided by a jack screw, push-rod, fluid-driven piston, or the like, within clamp housing 565, which may be driven by a solenoid, linear actuator, electric motor, compressor, or the like, which may be located, for example, within clamp housing 565. Force opposing force from springs 585 may transferred across a rotating interface between clamp housing 565 and a surrounding SLCS, similar to examples of a rotating interface discussed in relation to 101, between clamp housing 110 and bearing housing 105. If the force is transmitted electrically, e.g. via alternating or direct electrical current, such as to a motor within clamp housing 565 linked to a jack screw that applies force to movable jaw 580 in opposition to force from springs 585, one or more slip rings may provide such a rotating interface. When force from a motor or actuator is greater than the force from springs 585, movable jaw 580 may move away from fixed jaw 595. Under such circumstances, a suspension cable, if present in the jaw system, may be released, allowing SLCS and deployment system 501 to be released from such suspension cable. Under such circumstances, a suspension cable, if not present in the jaw system, may be inserted into cable entry channel 502 when the jaw system is open.

SLCS and deployment system 501 comprises internal frame 522, more components of which are illustrated in FIG. 9A, compared to FIG. 8A.

SLCS and deployment system 501 comprises sliding bracket assembly 590A and 590B. Sliding bracket assembly 590 secures movable jaw 580 to fixed jaw 595, while allowing movable jaw 580 to move toward and away from fixed jaw 595. A horizontal cross-section of sliding bracket assembly 590B is illustrated and discussed in relation to FIG. 11.

Figure 10A:
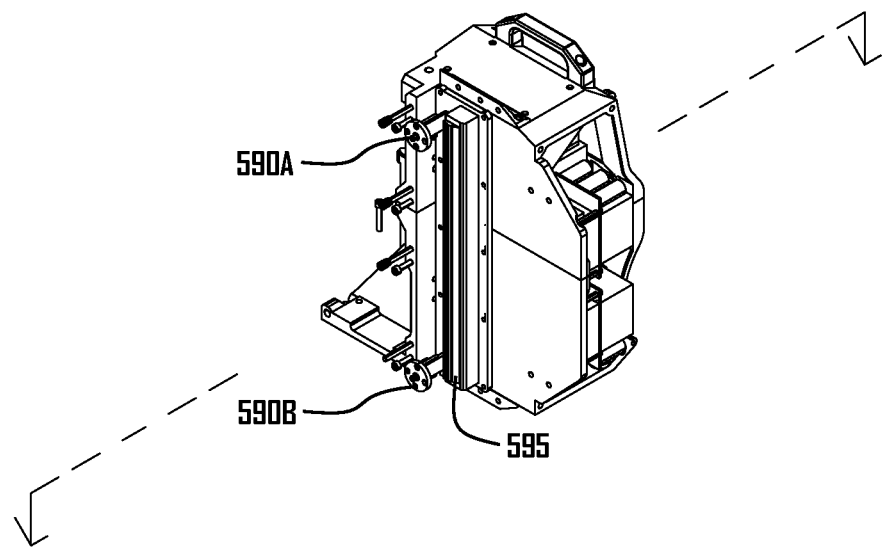
FIG. 10A is an isometric parallel projection view of the suspended load control system ("SLCS") incorporating the deployment system of FIG. 5A with additional or different components hidden relative to FIG. 9A, in accordance with an embodiment.
Figure 10B:
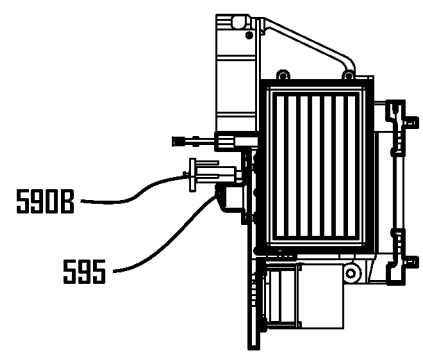
FIG. 10B is a top plan view of the suspended load control system ("SLCS") of FIG. 10A with a horizontal cross-section across the midline of the SLCS and deployment system, in accordance with an embodiment.

FIG. 10A is an isometric parallel projection view of SLCS and deployment system 501 of FIG. 5A with additional or different components hidden relative to FIG. 9A, in accordance with an embodiment. FIG. 10B is a top plan view of SLCS and deployment system 501 of FIG. 10A with a horizontal cross-section across the midline of SLCS and deployment system 501, in accordance with an embodiment.

SLCS and deployment system 501 comprises fixed jaw 595. Sliding bracket assembly 590B may be used to attach fixed jaw 595 and movable jaw 580.

Figure 11:
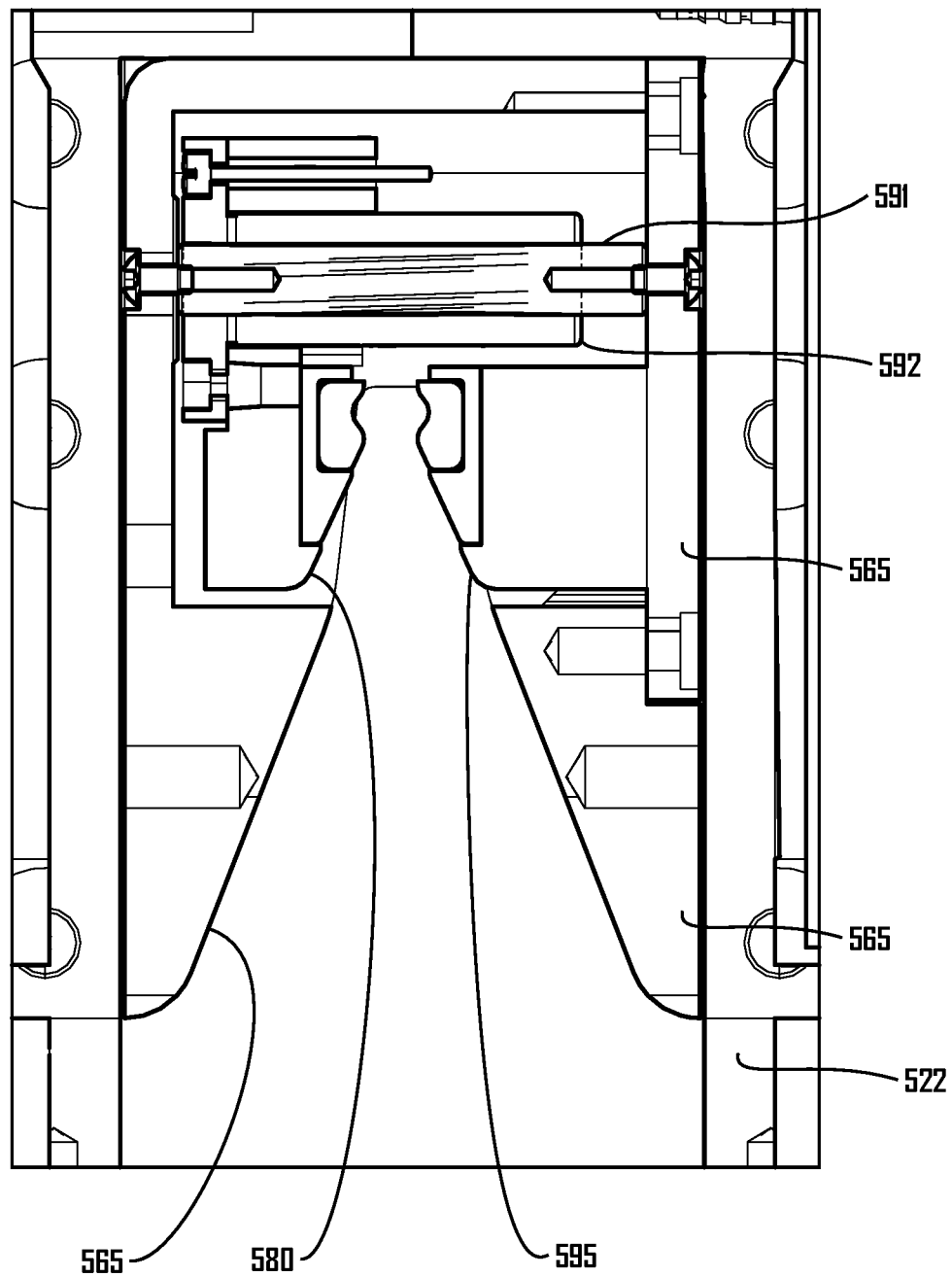
FIG. 11 is a detail view of a jaw bolt assembly within deployment system within a suspended load control system ("SLCS"), in accordance with an embodiment.

FIG. 11 is a detail view of an example of a sliding bracket assembly, such as sliding bracket assembly 130 and/or 590 within a deployment system within a suspended load control system ("SLCS"), in accordance with an embodiment.

The example of a sliding bracket assembly illustrated in FIG. 11 comprises fixed rod 591, which may be bolted (or otherwise secured) to, for example, a frame, such as internal frame 522 and/or clamp housing 565. Fixed rod 591 may be free to slide within cylinder 592. Cylinder 592 may be bolted (or otherwise secured) to, for example, movable jaw 580. Sliding bracket assembly 130 and/or 590 may allow movable jaw 580 to move relative to fixed jaw 595, within a confine defined by, for example, clamp housing 565. An example of such confine is illustrated in FIG. 13.

Figure 12A:
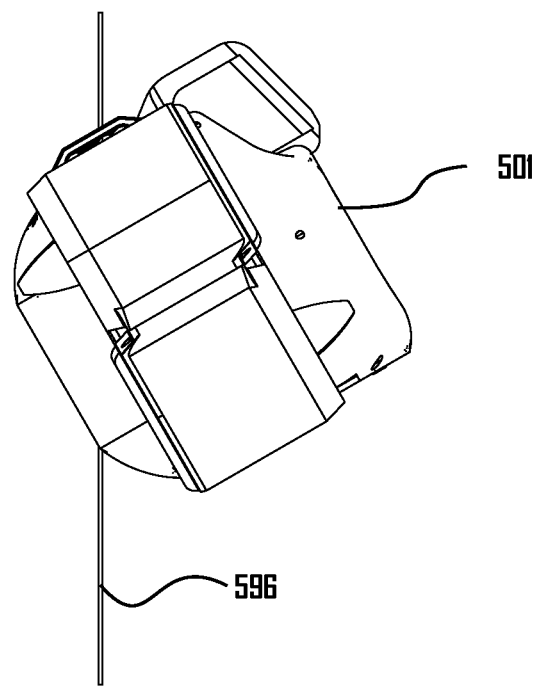
FIG. 12A is a side elevation of a suspended load control system ("SLCS") incorporating a deployment system in a first configuration relative to a suspension cable, in accordance with an embodiment.
Figure 12B:
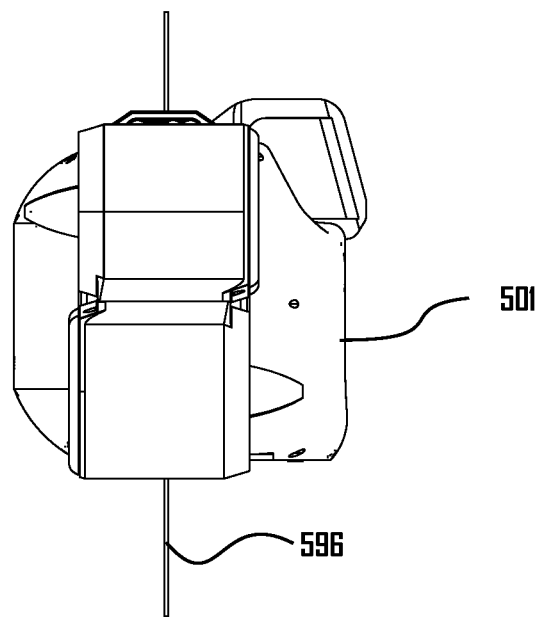
FIG. 12B is a side elevation of a suspended load control system ("SLCS") incorporating a deployment system in a second configuration relative to a suspension cable, in accordance with an embodiment.

FIG. 12A is a side elevation of SLCS and deployment system 501 in a first configuration relative to suspension cable 596, in accordance with an embodiment. FIG. 12B is a side elevation of SLCS and deployment system 501 in a second configuration relative to suspension cable 596, in accordance with an embodiment. In the first configuration, force produced by a motor or actuator, as may be found in, for example, electrical component box 535, and/or from power provided from a human hand as in the case of deployment system 101, has been transferred by a force-transmitting member or conduit against force from springs 585. When force from such a source is greater than force from springs 585, movable jaw 580 may move away from fixed jaw 595. Under such circumstances, when the jaw system is open, suspension cable 596 may be inserted into cable entry channel 502.

In the second configuration, SLCS and deployment system 501 has been aligned with suspension cable 596. When the jaw-opening force stops, for example, due to activation of a button, switch, signal, loss of power, or the like, spring 585 will move movable jaw 580 toward fixed jaw 595, providing uniform force on suspension cable 596, the jaw-system closes, clamping the jaws of the jaw-system to suspension cable 596. The jaw-opening force may be resumed, for example, due to activation of a button, switch, signal, providing power to the power source, or the like, to overcome the force of spring 585 and to move movable jaw 580 away from fixed jaw 595, opening the jaw-system to release SLCS and deployment system 501 from suspension cable 596.

Figure 13:
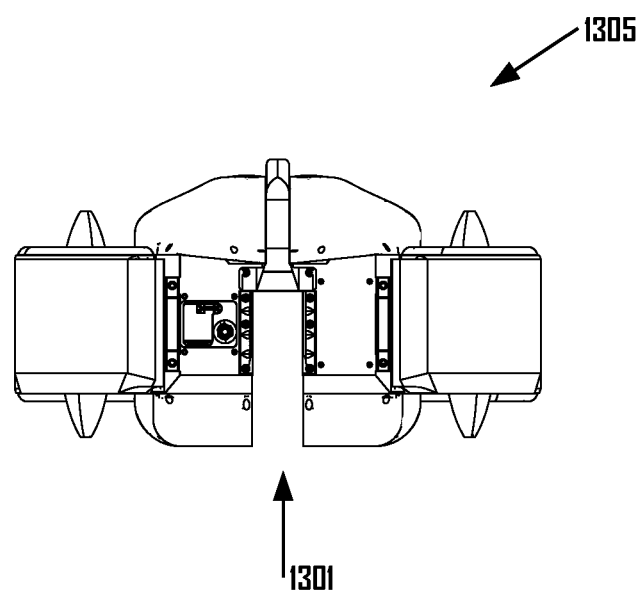
FIG. 13 is a top plan view of a suspended load control system ("SLCS") with an area for insertion of a deployment system, in accordance with an embodiment.

FIG. 13 is a top plan view of suspended load control system ("SLCS") 1305 with an area for insertion of a deployment system, such as deployment system space 1301, in accordance with an embodiment. For example, deployment system 101 may be inserted into deployment system space 1301 and attached to SLCS 1305, for example, with brackets, rods, dowels, bolts, flanges, etc.

Figure 14:
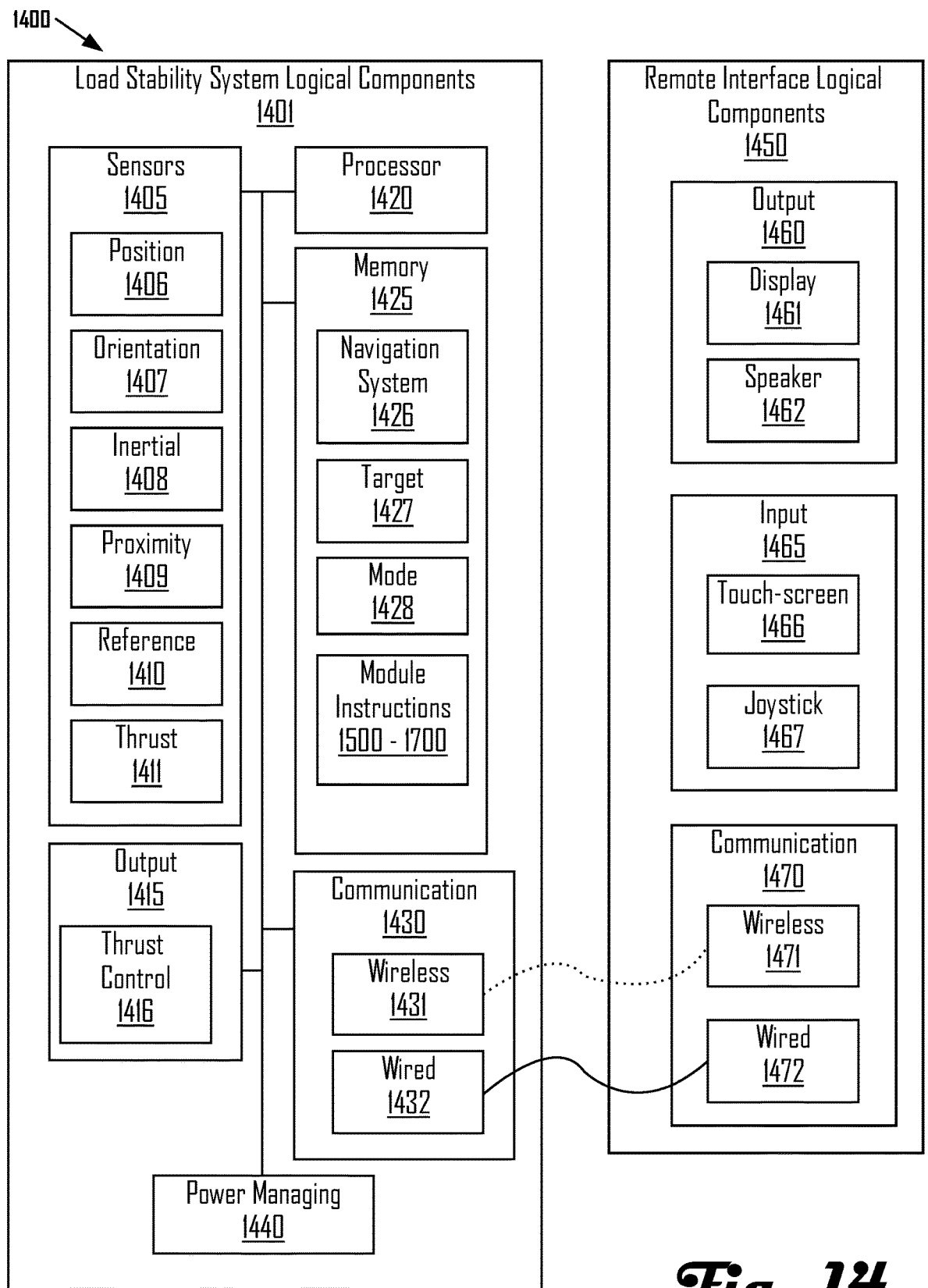
FIG. 14 schematically illustrates electrical, computer processor, memory, and logical components of a suspended load control system and of a remote interface, in accordance with an embodiment.

FIG. 14 schematically illustrates electrical, computer processor, memory, and logical components of a suspended load control system ("SLCS") 1400 including load control system logical components 1401 and remote interface 1450 in accordance with one embodiment. Within load control system logical components 1401 are sensor suite 1405, which can include position sensors 1406, orientation sensors 1407, inertial sensors 1408, proximity sensors 1409, reference location sensors 1410, and thrust sensors 1411. The SLCS processing capacity 1420 includes the processor and microcontrollers. SLCS memory 1425 generally comprises a random-access memory ("RAM") and permanent non-transitory mass storage device, such as a solid-state drive, and contains navigation systems 1426, target data 1427, mode or command state information 1428, and software or firmware code, instructions, or logic for one or more of operational module 1500, suspended load control decision and control module 1600, and deployment module 1700. Communication systems 1430 include wireless systems 1431 such as the wireless transceiver, and wired systems 1432. SLCS output 1415 includes thrust control 1416 via thruster controllers. Power managing systems 1440 regulate and distribute the power supply from, e.g., the batteries. A data bus connects the various internal systems and logical components of the SLCS.

An interactive display or remote interface 1450 is a computational unit that can be self-powered or hardwired into an airframe. The interactive display 1450 receives data from the SLCS, e.g., wirelessly. The data from the SLCS is displayed on the interactive display 1450; the computational data is parsed and converted to visual cues. The interactive display also communicates to the SLCS the operator's desired command states as discussed below.

The interactive display or remote interface 1450 is in communication with the SLCS 1401 via communication systems 1470, which may be wireless 1471 or wired 1472. Output 1460 from the remote interface 1450 may include information displayed on a screen 1461 and audio cues 1462. Input 1465 to the remote interface 1450 to control the SLCS may include commands through a touchscreen 1466 or a joystick 1467. In various embodiments, the remote interface 1450 may comprise one or more physical and/or logical devices that collectively provide the functionalities described herein.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 14, SLCS 1401 and remote interface 1450 are connected by a wired or wireless network.

An SLCS may work with a remote positional unit, target node, or reference of a suspended load control system in accordance with one embodiment. The remote positional unit, target node, or reference may comprise an external sensor suite or beacon configured to communicate, such as wirelessly, with the SLCS as a positional reference. If the SLCS is considered the primary sensor suite, a secondary sensor suite location can be the platform or carrier from which the cable is suspended, and a tertiary sensor suite location can be a location of interest for the load (e.g., for positioning to obtain or deliver the load).

A remote positional unit, target node, or reference can include a positional transceiver configured to communicate with the SLCS via a wireless transceiver and provide a positional reference. For example, a remote positional unit can be secured to a helicopter ownship or crane below which the load is suspended or can be secured to a target to which a load is to be delivered.

In some embodiments, the remote positional unit or target node may be made of durable polymer or plastic and may be, e.g., large enough to fit into a hand. The remote positional unit or target node may have an external antenna. The remote positional unit or target node may be secured to, e.g., the carrier, by magnets, bolts, or any other securement. The remote positional unit or target node may be dropped to a location on the ground or secured to, e.g., a life preserver or other flotational device, a rescuer, a load to be picked up, a location for a load to be delivered, or an operational specific location.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 14, load control system logical components 1401 and remote interface 1450 may be connected by a wired or wireless network.

Figure 15:
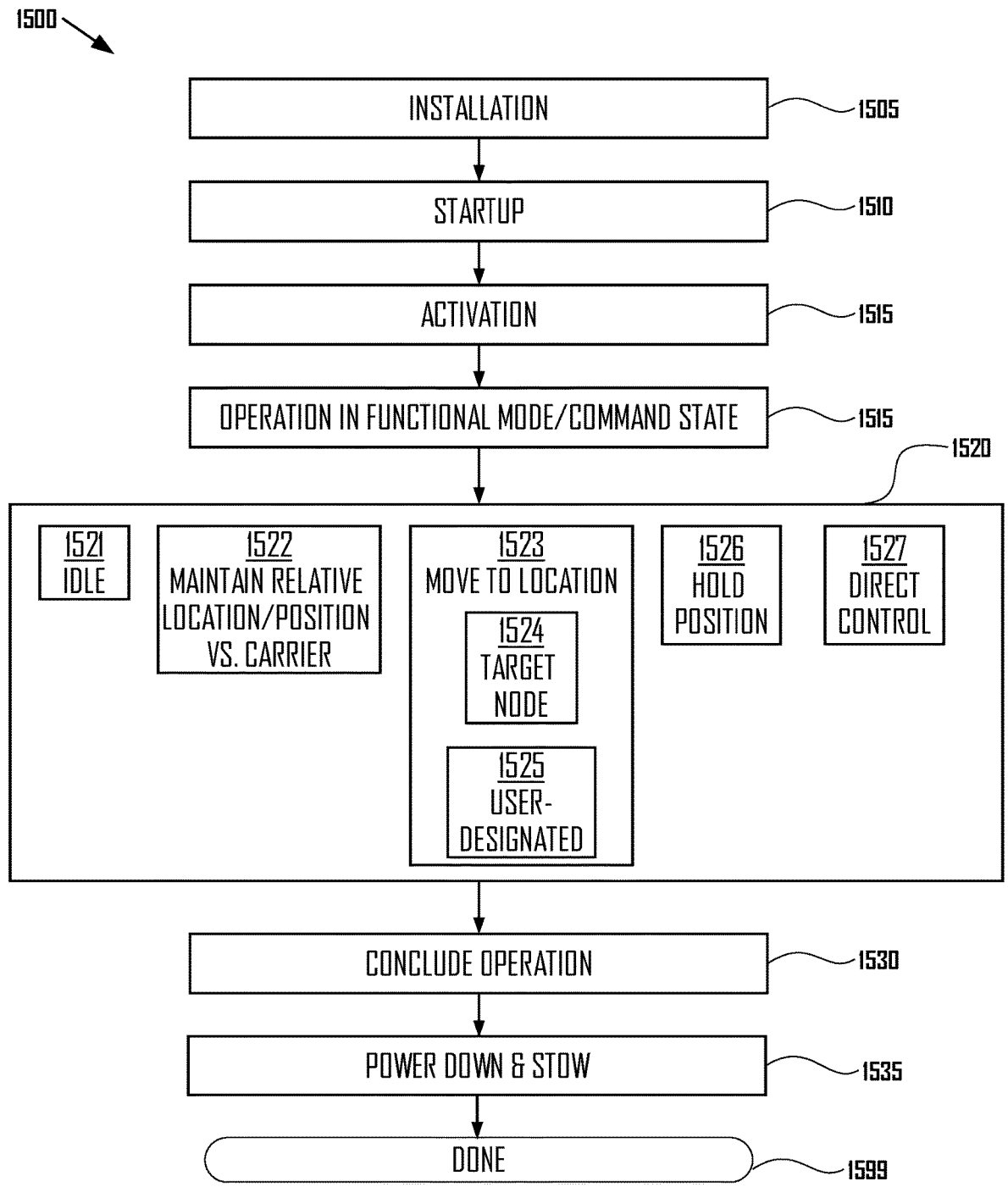
FIG. 15 illustrates an operational module of a suspended load control including multiple modes or command states in accordance with an embodiment.

FIG. 15 illustrates operational module 1500 of suspended load control system ("SLCS") including multiple modes or command states in accordance with one embodiment. Instructions of, or which embody, operational module 1500 may be stored in, for example, memory 1425, and may be executed or performed by, for example, processor 1420, as well as by electrical circuits, firmware, and other computer and logical hardware of SLCS with which operational module 1500 may interact.

Figure 17:
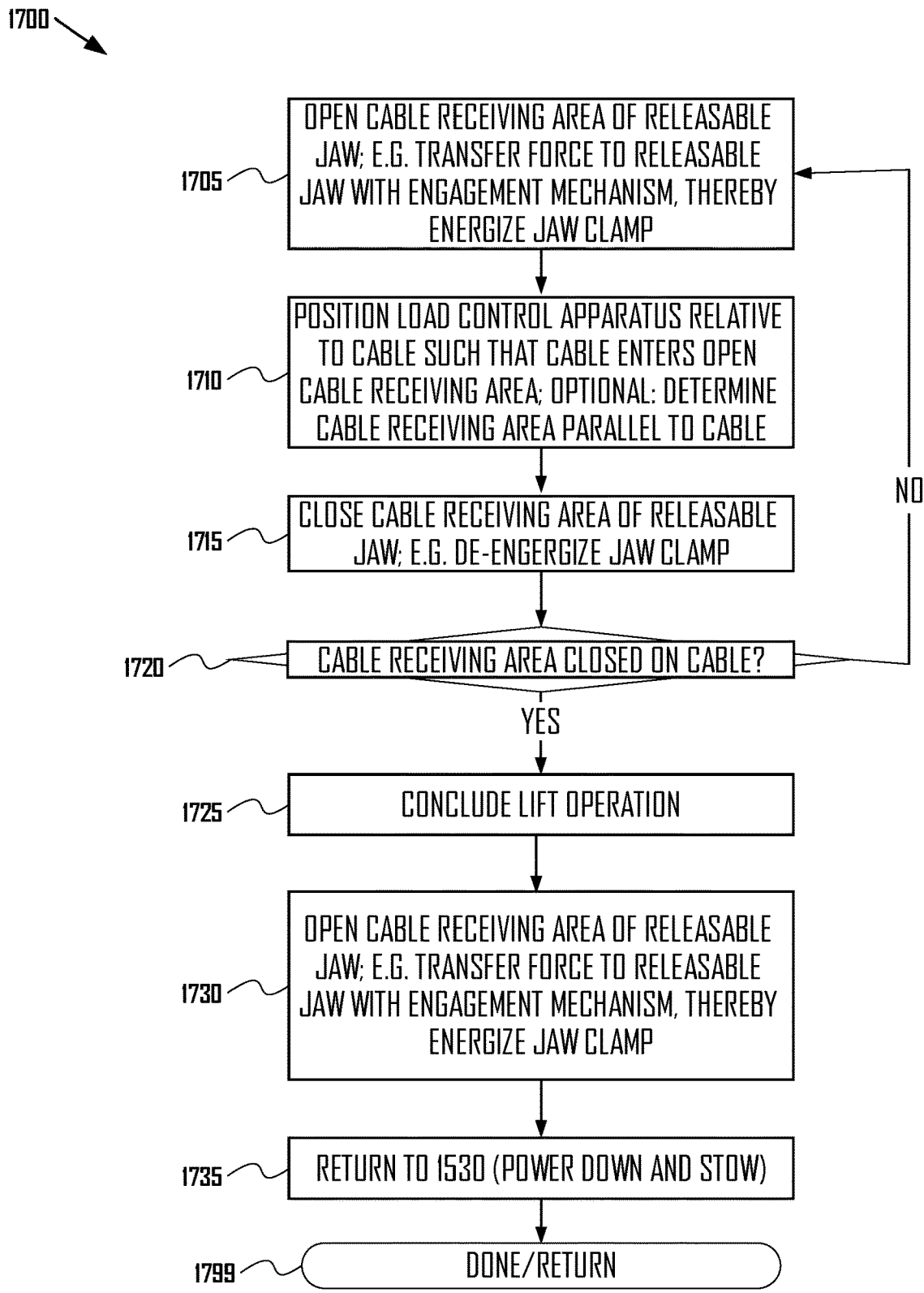
FIG. 17 illustrates a deployment routine or module, in accordance with an embodiment.

In block 1505, the load control system apparatus may be deployed onto a suspension cable from which a load may be suspended. An example of deployment module or routine is illustrated in FIG. 17. In embodiments, SLCS need not be powered on for deployment.

In block 1510, the SLCS is started up and operational module 1500 may be activated. In some embodiments, the system can be initialized by the press of a button located on a face of a center module of the SLCS. Near the accessible external button that can initialize the system, another button may be present that allows for immediate system shut down when pressed. In addition to the initialization interface on the center module, the system may also be initialized by an operator not directly next to the system. One or more external operators, including but not limited to a rescuer on the end of the cable, may initialize the system by pressing a button on one or more remote interface 1450 linked wirelessly to the SLCS.

In block 1515, the SLCS is activated, and proceeds to block 1520 and one of the SLCS functional modes or command states selected by the operator. In block 1520 and a functional mode or command state, operational module 1500 may perform or call suspended load control decision and control module 1600 as a subroutine or submodule, to implement a functional mode or command state.

The functional modes or command states of the system are:

Idle mode 1521: all internal systems of the SLCS are operating (e.g., the SLCS observes its motion and calculates corrective action), but the thrusters are shut off or maintain an idle speed only, without action to affect the motion of the load.

Maintain Relative Position vs. Ownship mode 1522: The SLCS is stabilized with respect to the slung origin point. For example, when the SLCS is suspended with a load below a helicopter, the SLCS will stay directly below the helicopter. The SLCS localizes the ownship motion and performs the corrective actions necessary to critically damp any other suspended load motion. If the ownship is traveling at a low speed, the SLCS will couple its velocity with the ownship so the two entities move in unison. Upon a disturbance to the load, the SLCS provides thrust in the direction of the disturbance to counteract the disturbance, eliminating the swing.

Move to/stop at Position mode 1523: The SLCS will stabilize to a fixed position, counteracting the influence of the weather or small movements of the helicopter or other suspending platform. This mode has the effect of killing all motion. The operator can send the desired target position to the SLCS via the remote interface 1450. This can be accomplished in at least two ways:

Target node position 1524: The operator can place a SLCS remote positional unit or target node 1410 at the desired lowering location (e.g., location 160 of FIG. 1). The target node or reference 1410 will communicate wirelessly with the SLCS to indicate the desired position, and the SLCS responds by maneuvering to the desired location. The remote interface 1450 UI will receive and display the location information of both entities.

User-designated position 1525: The operator can use the remote interface 1450 UI to send a designated position (e.g., latitude and longitude coordinates) as a commanded location to the SLCS. The system will then steadily direct the suspended load to the desired position. The system will simultaneously send feedback to the remote interface 1450 UI regarding position and distance information.

Hold Position mode 1526: The SLCS will resist all motion and maintain attempt to maintain its current position independent of the ownship's motion. This mode has the effect of dampening all motion of the SLCS. This mode has conditional responses relative respectively to ownship speed, safety factors, and physical constraints.

Direct Control mode 1527: Joystick operation of the SLCS in three degrees of freedom. The operator is able to directly control positioning, rotation, and thruster output level. Though the SLCS is entirely closed-loop and does not require external control during operation, there is an option for user control.

In block 1530, the operator completes the operation and retrieves the SLCS.

In block 1535, if the SLCS includes collapsible propulsion arms, they may be folded up. The load may be detached from a load hook, and the suspended cable may detached from a hoist ring at a top of the SLCS. The SLCS may be stowed in a charger or any convenient location.

At done block 1599, if not performed at block 1535, operational module 1500 may be shut down by pushing a button on an interactive display or remote interface or by pressing a button on the SLCS.

Figure 16:
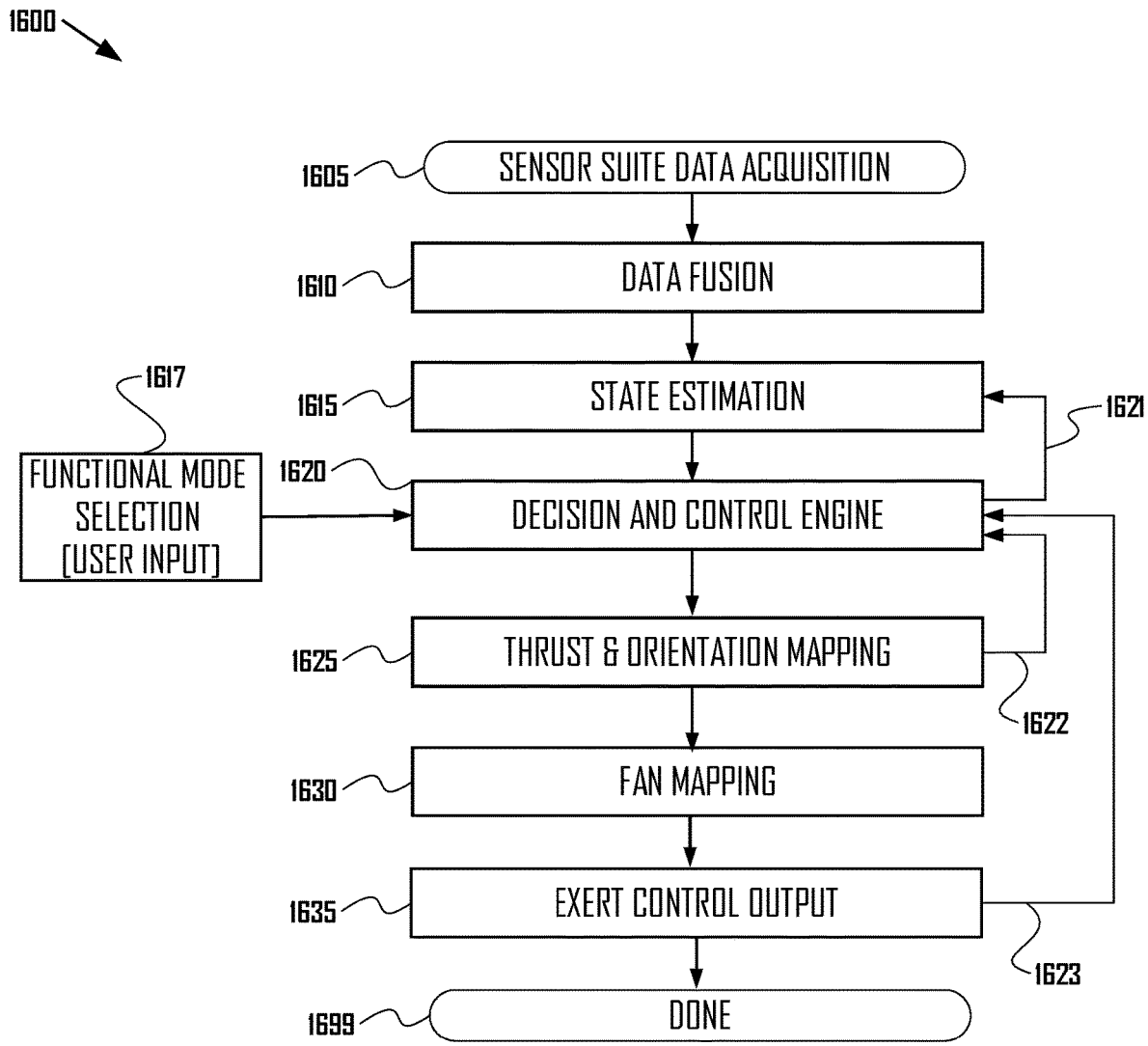
FIG. 16 illustrates a suspended load control decision and control module in accordance with an embodiment.

FIG. 16 illustrates decision and control module 1600 of a suspended load control system ("SLCS") in accordance with one embodiment. Instructions of, or which embody, decision and control module 1600 may be stored in, for example, memory 1425, and may be executed or performed by, for example, processor 1420, as well as by electrical circuits, firmware, and other computer and logical hardware of SLCS with which decision and control module 1600 may interact.

Decision and control module 1600 may operate in a closed loop to understand its position and motion in near real time, perform a set of calculations to determine the most desired system response, and send desired response(s) to the air propulsion system thruster array to mitigate swing of the cable during operations. This process is continuous as long as the system is powered.

At block 1605, decision and control module 1600 may perform data acquisition with a plethora of sensors including (but not limited to) accelerometer, gyroscope, magnetometer, GPS, lidar/radar, machine vision, and/or range finders.

At block 1610, the decision and control module 1600 combines data from the sensors to obtain a data fusion describing its position, orientation, motion, and environment.

Sensor data is fused and filtered by decision and control module 1600 through non-linear flavors of a Kalman Filter to yield an accurate representation of the system's state. Closed-loop control methods including fuzzy-tuned proportional, integral, and derivative feedback controllers have bidirectional communication with advanced control methods including deep learning neural nets and future propagated Kalman filters, allowing for further real-time system identification.

At block 1615, decision and control module 1600 performs state estimation using non-linear state estimators to project near-term future motion based on the data fusion and on feedback from the decision and control engine to the state estimator.

At block 1620, decision and control module 1600 takes state estimation 1615, informed by the user-selected functional mode or command state 1520, as well as additional feedback from the thrust and orientation mapping 1630 and output control 1640, and decides how the SLCS should move or exert force.

Algorithmic output is sent to motion controllers at which the desired thrust response will be sent to the electric duct fans via phase control. The net thrust output is mapped in real-time through encoders and load cells then sent back to the Host and Controllers for closed-loop control.

At block 1630, decision and control module 1600 maps how the SLCS should move or exert force to fans and potential fan output to generate a fan mapping to control the thrusters to achieve the determined thrust and orientation of the SLCS At block 1635, decision and control module 1600 applies the fan mapping to output control signals to the fans or thrusters (or electronic components controlling the same) to achieve the determined thrust and orientation of the SLCS, exerting commanded control output and implementing a dynamic response in the form of thrust from the fans.

At done block 1699, decision and control module 1600 may conclude or return to a module which may have called it.

FIG. 17 illustrates a deployment routine or module 1700, in accordance with an embodiment. Blocks of deployment routine or module 1700 may be performed, for example, by a human operator and/or instructions of, or which embody, blocks of deployment routine or module 1700 and which may be stored in, for example, memory 1425, may be executed or performed by, for example, processor 1420, as well as by electrical circuits, firmware, and other computer and logical hardware of SLCS with which deployment routine or module 1700 may interact.

At block 1705, deployment routine or module 1700 may open cable receiving area of releasable jaw. For example, an operator of an SLCS transfer force to releasable jaw with an engagement mechanism, which may counteract or overcome spring force of springs in spring system, energize releasable jaw, and open cable receiving area of releasable jaw. Transfer of force with engagement mechanism may be performed by, for example, squeezing a lever to transmit force through a conduit, or may be performed by, for example, pressing a button or other activator to trigger deployment routine or module 1700 to electrically activate a motor or actuator, to generate force by the actuator to counteract or overcome spring force of springs in spring system, energize releasable jaw, and open cable receiving area of releasable jaw.

At block 1710, deployment routine or module 1700 may position a load control apparatus relative to a suspension cable, such that the suspension cable enters the open cable receiving area of releasable jaw. Performance of this may be by an operator of the SLCS. Optionally, deployment routine or module 1700 may determine whether the cable receiving area is parallel to or contains the suspension cable. For example, the operator may determine this and/or the SLCS may have a level or orientation sensor and/or the SLCS may have suspension cable sensor(s) in the cable receiving area (such as conductivity sensors), which sensor(s) may output information regarding orientation to the operator or which may lock the releasable jaw in an open state until the cable receiving area is parallel to or contains the suspension cable.

At block 1715, deployment routine or module 1700 may close the cable receiving area of releasable jaw. For example, an operator of SLCS may release a lever which had been transferring force to the releasable jaw with the engagement mechanism, thereby withdrawing such force and allowing spring force from springs in spring system to deenergize and close releasable jaw. For example, the operator may press a switch or other activator to trigger deployment routine or module 1700 to deactivate an actuator or to cause the actuator to withdraw force and allowing spring force from springs in spring system to deenergize and close releasable jaw.

At decision block 1720, deployment routine or module 1700 may determine whether the cable receiving area is closed on a suspension cable. For example, sensors discussed in relation to block 1710, such as conductivity sensors, may determine whether a suspension cable is uniformly present along cable receiving area and/or may determine whether walls of cable receiving area are parallel. For example, if a suspension cable is only present in a top of cable receiving area, the cable receiving area may not be uniformly closed and walls of the cable receiving area may not be uniformly parallel and/or conductivity between sides of cable receiving area may not be uniform and consistent with a metal suspension cable, which condition may be sensed.

If negative or equivalent at decision block 1720, deployment routine or module 1700 may proceed to block 1705.

If affirmative or equivalent at decision block 1720, deployment routine or module 1700 may proceed to block 1725.

At block 1725, deployment routine or module 1700 may conclude a lift operation. This may be performed by, for example, landing a load at a desired target.

At block 1730, deployment routine or module 1700 may open the cable receiving area of releasable jaw. For example, deployment routine or module 1700 may transfer force to releasable jaw with engagement mechanism, thereby energizing releasable jaw. This block may be similar to block 1705 and may result in the opening of cable receiving area, which may allow the suspension cable to disengage from SLCS.

At block 1735, deployment routine or module 1700 may return to block 1530 of FIG. 15.

At block 1799, deployment routine or module 1700 may conclude or return to a module or process which may have called it.

The entire process is unmanned and automated aside from the high-level operator-selected functional control modes. The net output is a control force to stabilize a suspended load.

Status indicator lights may be mounted on various surfaces of an SLCS to aid in visibility and operation of the SLCS from above and below. For example, an SLCS may have external lighting such as LEDs near the thrusters that identify the edges and orientation of the SLCS. This allows for improved identification in hard viewing situations such as inclement weather. During operation, both on the interactive display and the system body itself the LED display indicators show that the system is active and convey useful information.

Front and back covers 520 and 525 may contain and protect computer hardware, such as a computer processor and memory, a power supply, electronic speed controllers, microcontrollers, sensors, and the like, such as load stability system logical components 1401. Front and back covers 520 and 525 may be attached to internal frame 522. The power supply may be a single power brick or an array of battery cells wired in series and/or in parallel, such as lithium-polymer (LiPo) cells. The batteries may be removable for inspection and/or to swap discharged and charged batteries. Batteries may be charged while installed in the SLCS (i.e., without having to remove them) via nodes or a wireless charging system on or in an SLCS that connect to a charging dock. Batteries may include auxiliary battery(ies) to supply a steady supply of power to the processor even if thrusters in fan units draw a relatively large amount of power from main batteries. In embodiments, a carrier from which the SLCS is suspended, such as a helicopter or crane, can provide power through a line extending down the suspension cable to the SLCS. In embodiments, the carrier can provide some power to the SLCS, while the SLCS may obtain other power from an on-board power supply. In various embodiments, the SLCS may be powered by a combination of on-board and remote power. In many environments, all power for the SLCS is contained on board, allowing fully autonomous operation without dependence on the availability of external power sources or delivery means.

Contained within front and back covers 520 and 525 may be a data link which allows a microcontroller unit or processor to monitor power information including (but not limited to) cell voltage and real-time power dissipation or consumption.

Contained within front and back covers 520 and 525 may be a thruster controller to allow a computer processor to control the speed, power draw, and thrust of thrusters in the EDF. The thruster controller may be, e.g., an electronic speed controller ("ESC") for an EDF. An ESC typically has at least three connections: to the power supply, to a thruster, and to the processor or a microcontroller, or both. The ESC pulls power from the power supply and allocates it to the thrusters to control the amount of thrust produced by the EDF.

Contained within front and back covers 520 and 525 may be a computer processor or central processing unit (CPU). The processor may be an embedded system including a signal board computer and one or more microcontroller units ("MCUs"). The CPU and MCUs may be contained within a housing in which data link connections may be made. Front and back covers 520 and 525 may be made of or comprise a rugged plastic or polymer, protecting the system from environmental and operational factors such as weather and other operational conditions. In some embodiments, the CPU and MCUs are mounted to the same printed circuit board (PCB).

Front and back covers 520 and 525 may contain one or more wireless transceivers, which may comprise separate transmitter(s) and receiver(s), as well as antennas for wireless communication. The transceiver and/or wireless antennas may also be mounted to or printed on the same printed circuit board as the processor. The wireless transceivers may comprise access points for Bluetooth, Wi-Fi, microwave, and/or radio frequency (RF) transmission and reception. Wireless transceivers may be used to communicate with remote sensors, a remote control unit, a remote positional unit or target node, a remote interface, and the like, as discussed further herein.

With reference to SLCS, front and back covers 520 and 525 may contain a vector navigation unit, which may include an inertial measurement unit ("IMU"). The IMU provides inertial navigation data to the processor and modules executed by the processor.

SLCS and/or deployment system 501 may comprise or be communicatively coupled to one or more sensors in addition to the IMU. Such additional sensors may comprise, for example, an inertial measurement system, an orientation measurement system, an absolute position measurement system, a conductivity sensor, and the like. The inertial measurement system ("IMS") may include 3 degrees of freedom (3DOF) accelerometers, gyroscopes, and gravitational sensors, which may comprise microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors.

Sensors may further comprise a proximity sensor or light detection and ranging (LIDAR) system (e.g., rotating or linear), and/or an optical sensor such as one or more cameras or infrared (IR) sensors. Proximity sensors may include ground height sensors. Optical sensors can also provide visual information to a user. This information may be communicated to remote devices by the SLCS processor, via a data link cable and/or the wireless transceiver. Proximity and optical sensors allow the system to be capable of 360 degree awareness and collision avoidance by detecting obstacles (e.g., a portion of a tree canopy) and altering the course of the SLCS to avoid the obstacles. The system is also capable of providing ground (or water) position data to aircraft pilot and crew. Sensors which require a view of a surrounding environment may be placed on or at the surface of front and back covers 520 and 525 and/or remote from front and back covers 520 and 525.

Additional SLCS sensors may include a strain sensor to gauge load on housings, on fan unit(s), on conduits, on a cable receiving area, on springs, on an attachment to a suspension cable, or the like. Additional sensors may include a rotational encoder or thruster speed sensor which may be incremental or absolute, and a shutdown pin presence sensor.

SLCS and deployment system 501 can use remote positional sensors or beacons, remote computational units, or target node transceiver devices to assist in characterizing the location and/or motion of the suspending load and/or SLCS and deployment system 501 (e.g., relative to a helicopter ownship), the carrier, and a target location of interest such as a person to rescue or a load destination.

The SLCS processor applies algorithms to received sensor system data to yield a desired system response. For example, GPS sensor data may be refined through real-time kinetic (RTK) algorithms to develop a refined absolute position. The measurements may be fused together through non-linear data fusion methods, such as Kalman filtration methods, to yield optimal state estimates in all degrees of freedom to characterize the system's location and motion in geodetic space.

Examples of components and modules which may be within SLCS and deployment system 501 and within remote positional sensors or beacons, remote computational units, or target node transceiver devices are discussed further herein, such as in relation to FIGS. 14, 15, 16, and 17.

SLCS and deployment system 501 may be formed of any suitable material such as metals, plastic, and composite materials, such as fiber reinforced resin. SLCS and deployment system 501 may allow access into internal space via a sealed hatch or one or more removable panels, allowing for maintenance and inspection.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter ownship, in other embodiments an SLCS may be employed under a construction crane or gantry. This application is intended to cover any adaptations or variations of the embodiments discussed herein.

Following are non-limiting examples.

Example 1. A deployment apparatus to secure or not secure a load control apparatus onto a suspension cable, wherein the deployment apparatus comprises: a releasable jaw, an engagement mechanism to place the releasable jaw in an open state or a closed state, wherein the releasable jaw comprises a cable receiving area, wherein the cable receiving area is to receive or not receive the suspension cable, and wherein the releasable jaw is to secure the load control apparatus to the suspension cable when the suspension cable is present in the cable receiving area and the releasable jaw is in the closed state and is to not secure the load control apparatus onto the suspension cable when the releasable jaw is in the open state.

Example 2. The deployment apparatus according to example 1 or another example herein, such as example 1, wherein the releasable jaw comprises a spring system, wherein the spring system is to hold or bias the releasable jaw in the open or closed state.

Example 3. The deployment apparatus according to one or more of example 1 to example 2 or another example herein, such as example 2, wherein the engagement mechanism is to place the releasable jaw in the open state or the closed state by transfer of an input force to the spring system.

Example 4. The deployment apparatus according to one or more of example 1 to example 3 or another example herein, such as example 1, wherein the releasable jaw comprises a fixed jaw and a movable jaw, wherein the fixed jaw is within a clamp housing.

Example 5. The deployment apparatus according to one or more of example 1 to example 4 or another example herein, such as example 4, wherein the movable jaw has a degree of freedom of motion relative to the clamp housing, wherein the degree of freedom of motion allows the movable jaw to move toward the fixed jaw or away from the fixed jaw, wherein when the releasable jaw is in the closed state the movable jaw is maximally toward the fixed jaw.

Example 6. The deployment apparatus according to one or more of example 1 to example 5 or another example herein, such as example 5, wherein when the releasable jaw is in the open state the movable jaw is not maximally toward the fixed jaw.

Example 7. The deployment apparatus according to one or more of example 1 to example 6 or another example herein, such as example 4, wherein a spring system is to bias or hold the releasable jaw into one of the open state or the closed state.

Example 8. The deployment apparatus according to one or more of example 1 to example 7 or another example herein, such as example 7, wherein the spring system is to bias the releasable jaw into one of the open state or the closed state by removal of or transmission of a spring force from the spring system to the movable jaw.

Example 9. The deployment apparatus according to one or more of example 1 to example 8 or another example herein, such as example 8, wherein the engagement mechanism is to place the releasable jaw into the open state by transfer of an input force from the engagement mechanism to the spring system, wherein the input force counteracts the spring force.

Example 10. The deployment apparatus according to one or more of example 1 to example 9 or another example herein, such as example 9, wherein the engagement mechanism comprises an actuator to generate the input force.

Example 11. The deployment apparatus according to one or more of example 1 to example 10 or another example herein, such as example 10, wherein the actuator comprises at least one of a lever for a human to apply the input force to or a motor to generate the input force.

Example 12. The deployment apparatus according to one or more of example 1 to example 11 or another example herein, such as example 4, wherein the clamp housing has a degree of freedom of motion within the deployment apparatus, wherein the degree of freedom of motion of the clamp housing is to allow the clamp housing to rotate about the cable receiving area.

Example 13. The deployment apparatus according to one or more of example 1 to example 12 or another example herein, such as example 12, wherein the degree of freedom of motion of the clamp housing is provided by a bearing set at an interface between the clamp housing and the deployment apparatus.

Example 14. The deployment apparatus according to one or more of example 1 to example 13 or another example herein, such as example 12, wherein the degree of freedom of motion of the clamp housing is to allow the clamp housing to rotate about the cable receiving area such that when the releasable jaw is in the closed state and releasable jaw is secured to the suspension cable within the cable receiving area, the deployment apparatus is to rotate about the suspension cable without imparting a rotational force on the suspension cable.

Example 15. The deployment apparatus according to one or more of example 1 to example 14 or another example herein, such as example 14, wherein the deployment apparatus is secured to the load control apparatus and wherein the load control apparatus and the deployment apparatus are to rotate about the suspension cable without imparting the rotational force on the suspension cable.

Example 16. The deployment apparatus according to one or more of example 1 to example 15 or another example herein, such as example 2, wherein the spring system comprises at least one of a spring or a releasable one-way ratchet.

Example 17. The deployment apparatus according to one or more of example 1 to example 16 or another example herein, such as example 1, wherein the deployment apparatus is secured to the load control apparatus and wherein the load control apparatus comprises a fan, a load control cable, and a load control module, wherein the load control cable is to secure the deployment apparatus to a load and wherein the load control module is to cause the fan to output a force vector.

Example 18. The deployment apparatus according to one or more of example 1 to example 17 or another example herein, such as example 17, wherein the force vector is to bias the deployment apparatus relative to an objective.

Example 19. The deployment apparatus according to one or more of example 1 to example 18 or another example herein, such as example 17, wherein the force vector is to be communicated to the load by the load control cable.

Example 20. The deployment apparatus according to one or more of example 1 to example 19 or another example herein, such as example 17, wherein the objective is at least one of rotating or countering a rotation of the load, rotating or countering a pendular motion of the load relative to a carrier, a position relative to the carrier, or a position on a surface remote from the carrier.

Example 21. The deployment apparatus according to one or more of example 1 to example 20 or another example herein, such as example 1, wherein the releasable jaw comprises an elastomer, wherein the elastomer is to contact the suspension cable when the suspension cable is in the cable receiving area and the releasable jaw is in the closed state.

Example 22. The deployment apparatus according to one or more of example 1 to example 21 or another example herein, such as example 1, wherein the releasable jaw is to be in the closed state when the engagement mechanism is not energized.

Example 23. The deployment system according to one or more of example 1 to example 22 or another example herein, such as example 22, wherein the engagement mechanism is energized when the engagement mechanism outputs a force to the releasable jaw.

Example 24. The deployment system according to one or more of example 1 to example 23 or another example herein, such as example 23, wherein the force output by the engagement mechanism is to counteract a spring force of a spring system of the releasable jaw, wherein the spring force is to bias or hold the releasable jaw in the closed state.

Example 25. A deployment system to secure or not secure a load control system onto a suspension cable, wherein the deployment system comprises: an engagement mechanism and the load control system, wherein the engagement mechanism is to place a releasable jaw of the deployment system in an open state or a closed state, wherein the releasable jaw comprises a cable receiving area, wherein the cable receiving area is to receive or not receive the suspension cable, and wherein the releasable jaw is to secure the load control system to the suspension cable when the suspension cable is present in the cable receiving area and the releasable jaw is in the closed state and is to not secure the load control system onto the suspension cable when the releasable jaw is in the open state and wherein the releasable jaw is to be in the closed state when the engagement mechanism is not energized.

Example 26. The deployment system of example 25 or another example herein, wherein the load control system comprises a fan, a load control cable, and a load control module, wherein the load control cable is to secure the load control system to a load and wherein the load control module is to cause the fan to output a force vector.

Example 27. A method of securing a load control apparatus on a suspension cable, comprising: energizing a releasable jaw of the load control apparatus with an engagement mechanism, wherein energizing the releasable jaw causes a cable receiving area of the releasable jaw to open to receive a suspension cable, positioning the load control apparatus relative to the suspension cable such that the suspension cable enters the open cable receiving area of the releasable jaw, with the engagement mechanism, de-energizing the releasable jaw and causing the cable receiving area of the releasable jaw to close around the suspension cable and secure the load control apparatus to the suspension cable.

Example 28. The method of example 27 or another example herein, wherein the releasable jaw comprises a spring system, wherein the spring system biases the releasable jaw to close when the releasable jaw is de-energized.

Example 29. The method of one or more of example 27 to example 28 or another example herein, such as example 27, wherein energizing the releasable jaw of the load control apparatus with the engagement mechanism comprises transferring a force to the releasable jaw with the engagement mechanism.

Example 30. The method of one or more of example 27 to example 29 or another example herein, such as example 29, wherein transferring the force to the releasable jaw with the engagement mechanism comprises at least one of squeezing a lever or engaging an actuator, wherein squeezing the lever or engaging the actuator transfers the force through a conduit to the releasable jaw.

Example 31. The method of one or more of example 27 to example 30 or another example herein, such as example 28, wherein transferring the force to the releasable jaw with the engagement mechanism comprises compressing a spring in the spring system, wherein compressing the spring energizes the releasable jaw and causes the cable receiving area of the releasable jaw to open to receive the suspension cable.

Example 32. The method of one or more of example 27 to example 31, such as example 27, wherein the load control apparatus comprises a processor and memory, a load control module in the memory comprising instructions, wherein the instructions of the load control module are performed by the processor, and further comprising activating the processor to execute the instructions of the load control module to control a load suspended by the suspension cable with the load control apparatus.

Example 33. The method of one or more of example 27 to example 32 or another example herein, such as example 32, wherein activating the processor to execute the instructions of the load control module to control the load suspended by the suspension cable comprises operating the load control module in a functional mode or command state, determining a desired physical state of the load control apparatus according to the functional mode or command state, determining a current physical state of the load control apparatus, determining a thrust output of the load control apparatus to bias the load control apparatus from the current physical state to the desired physical state, mapping the thrust output of the load control apparatus to a fan of the load control apparatus, and causing the fan of the load control apparatus to output a force vector, wherein the force vector biases the load control apparatus from the current physical state to the desired physical state.

What is claimed is:

1. A deployment apparatus to secure or not secure a load control apparatus onto a suspension cable, wherein the deployment apparatus comprises:
   a bearing, housing, a clamp housing, a releasable jaw, and an engagement mechanism to place the releasable jaw in an open state or a closed state;
   wherein the releasable jaw comprises a cable receiving area, wherein the cable receiving area is to receive or not receive the suspension cable, and wherein the releasable jaw is to secure the load control apparatus to the suspension cable when the suspension cable is present in the cable receiving area and the releasable jaw is in the closed state and is to not secure the load control apparatus onto the suspension cable when the releasable jaw is in the open state;
   wherein the releasable jaw is within the clamp housing; wherein the load control apparatus is to be secured to bearing housing; wherein the bearing housing and the clamp housing have a degree of freedom of motion between the bearing housing and the clamp housing; and wherein the degree of freedom of motion between the bearing housing and the clamp housing is to allow the bearing housing and the load control apparatus to rotate in yaw about the clamp housing and the cable receiving area.

2. The deployment apparatus according to claim 1, wherein the releasable jaw comprises a spring system, wherein the spring system is to hold or bias the releasable jaw in the open or closed state.

3. The deployment apparatus according to claim 2, wherein the engagement mechanism is to place the releasable jaw in the open state or the closed state by transfer of an input force to the spring system.

4. The deployment apparatus according to claim 1, wherein the releasable jaw comprises a fixed jaw and a movable jaw.

5. The deployment apparatus according to claim 4, wherein the movable jaw has a degree of freedom of motion of the movable jaw relative to the clamp housing, wherein the degree of freedom of motion of the movable jaw relative to the clamp housing, allows the movable jaw to move toward the fixed jaw or away from the fixed jaw, wherein when the releasable jaw is in the closed state the movable jaw is maximally toward the fixed jaw.

6. The deployment apparatus according to claim 5, wherein when the releasable jaw is in the open state the movable jaw is not maximally toward the fixed jaw.

7. The deployment apparatus according to claim 4, wherein a spring system is to bias or hold the releasable jaw into one of the open state or the closed state.

8. The deployment apparatus according to claim 7, wherein the spring system is to bias the releasable jaw into one of the open state or the closed state by removal of or transmission of a spring force from the spring system to the movable jaw.

9. The deployment apparatus according to claim 8, wherein the engagement mechanism is to place the releasable jaw into the open state by transfer of an input force from the engagement mechanism to the spring system, wherein the input force counteracts the spring force.

10. The deployment apparatus according to claim 9, wherein the engagement mechanism comprises an actuator to generate the input force.

11. The deployment apparatus according to claim 1, wherein the degree of freedom of motion between the bearing housing and the clamp housing is provided by a bearing interface between the clamp housing and the bearing housing.

12. The deployment apparatus according to claim 11, wherein the degree of freedom of motion between the bearing housing and the clamp housing is to allow the bearing housing and the load control apparatus to rotate in yaw about the clamp housing and the cable receiving area such that when the releasable jaw is in the closed state and releasable jaw is secured to the suspension cable within the cable receiving area, the bearing housing and load control apparatus are to rotate about clamp housing, the cable receiving area, and the suspension cable without imparting a rotational force on the suspension cable.

13. The deployment apparatus according to claim 1, wherein the load control apparatus comprises a fan, a load control cable, and a load control module, wherein the load control cable is to secure the deployment apparatus to a load, wherein the suspension cable is to secure the load control apparatus to a carrier, and wherein the load control module is to cause the fan to output a force vector, wherein the force vector is to bias the load control apparatus relative to an objective, and wherein the force vector is to be communicated to the load by the load control cable.

14. The deployment apparatus according to claim 1, wherein the cable receiving area comprises a vertical channel, wherein the vertical channel spans a height of the releasable jaw.

15. A deployment system to secure or not secure a load control system onto a suspension cable, wherein the deployment system comprises:

an engagement mechanism and the load control system, wherein the engagement mechanism is to place a releasable jaw of the deployment system in an open state or a closed state, wherein the releasable jaw comprises a cable receiving area, wherein the cable receiving area is to receive or not receive the suspension cable, and wherein the releasable jaw is to secure the load control system to the suspension cable when the suspension cable is present in the cable receiving area and the releasable jaw is in the closed state and is to not secure the load control system onto the suspension cable when the releasable jaw is in the open state and wherein the releasable jaw is to be in the closed state when the engagement mechanism is not energized;

wherein the releasable jaw is within the clamp housing;

wherein the load control apparatus is to be secured to bearing housing;

wherein the bearing housing and the clamp housing have a degree of freedom of motion between the bearing housing and the clamp housing; and wherein the degree of freedom of motion between the bearing housing and the clamp housing is to allow the bearing housing and the load control apparatus to rotate in yaw about the clamp housing and the cable receiving area.

16. The deployment system of claim 15, wherein the load control system comprises a fan, a load control cable, and a load control module, wherein the load control cable is to secure the load control system to a load, wherein the suspension cable is to secure the load control apparatus to a carrier, and wherein the load control module is to cause the fan to output a force vector.

17. A method of securing a load control apparatus on a suspension cable, comprising:

energizing a releasable jaw of the load control apparatus with an engagement mechanism, wherein energizing the releasable jaw causes a cable receiving area of the releasable jaw to open to receive a suspension cable, positioning the load control apparatus relative to the suspension cable such that the suspension cable enters the open cable receiving area of the releasable jaw, with the engagement mechanism, de-energizing the releasable jaw and causing the cable receiving area of the releasable jaw to close around the suspension cable and secure the load control apparatus to the suspension cable, wherein the releasable jaw is within a clamp housing, wherein a bearing housing and the clamp housing have a degree of freedom of motion between the bearing housing and the clamp housing, wherein the degree of freedom of motion between the bearing housing and the clamp housing is to allow the hearing housing to rotate in yaw about the clamp housing and the cable receiving area and wherein the degree of freedom of motion between the bearing housing and the clamp housing is provided by a bearing interface between the clamp housing and the bearing housing.

18. The method of claim 17, wherein the releasable jaw comprises a spring system, wherein the spring system biases the releasable jaw to close when the releasable jaw is de-energized.

19. The method of claim 17, wherein energizing the releasable jaw of the load control apparatus with the engagement mechanism comprises transferring a force to the releasable jaw with the engagement mechanism.

20. The method of claim 19, wherein transferring the force to the releasable jaw with the engagement mechanism comprises compressing a spring in the spring system, wherein compressing the spring energizes the releasable jaw and causes the cable receiving area of the releasable jaw to open to receive the suspension cable.

* * * * *